(12) United States Patent
Hashimoto et al.

(10) Patent No.: US 7,750,893 B2
(45) Date of Patent: Jul. 6, 2010

(54) STORAGE MEDIUM STORING INPUT POSITION PROCESSING PROGRAM, AND INPUT POSITION PROCESSING DEVICE

(75) Inventors: Hideyuki Hashimoto, Kyoto (JP); Shigetoshi Kitayama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1136 days.

(21) Appl. No.: 11/290,488

(22) Filed: Dec. 1, 2005

(65) Prior Publication Data
US 2006/0227106 A1 Oct. 12, 2006

(30) Foreign Application Priority Data

Apr. 6, 2005 (JP) .............................. 2005-109986
Apr. 6, 2005 (JP) .............................. 2005-109987

(51) Int. Cl.
*G09G 5/00* (2006.01)
(52) U.S. Cl. ...................... 345/173; 345/156; 345/157
(58) Field of Classification Search .............. 345/87, 345/156–179, 901–905; 178/18.01–19.05
See application file for complete search history.

(56) References Cited

U.S. PATENT DOCUMENTS

| | | | | |
|---|---|---|---|---|
| 5,467,102 | A * | 11/1995 | Kuno et al. | ............ 345/1.3 |
| 5,990,893 | A | 11/1999 | Numazaki | |
| 6,297,945 | B1 | 10/2001 | Yamamoto | |
| 6,313,853 | B1 * | 11/2001 | Lamontagne et al. | ........ 715/762 |
| 7,573,462 | B2 * | 8/2009 | Ouchi | ............ 345/157 |
| 2003/0197744 | A1 | 10/2003 | Irvine | |
| 2004/0141649 | A1 | 7/2004 | Landstad et al. | |

FOREIGN PATENT DOCUMENTS

| | | |
|---|---|---|
| JP | 5-127819 A | 5/1993 |
| JP | 07-294892 | 11/1995 |
| JP | 08-076926 | 3/1996 |

(Continued)

OTHER PUBLICATIONS

Willey, "Design and Implementation of a Stroke Interface Library", Internet Article, Mar. 24, 1997, 6 pages, IEEE Region 4 Student Paper Contest, http://citeseer.ist.psu.edu/cache/papers/cs/24072/http:zSzzSzwww.etla.netzSzlibstrokezSzlibstroke.pdf/willey97design.pdf.

(Continued)

*Primary Examiner*—Richard Hjerpe
*Assistant Examiner*—Mansour M Said
(74) *Attorney, Agent, or Firm*—Nixon & Vanderhye P.C.

(57) ABSTRACT

An input position processing program detects a series of pieces of position data based on input positions outputted from a pointing device, and defines a reference position. When the last piece of position data indicates a point within a defined area other than a reference area, an operation is to be performed determined based on a direction that extends from the reference position to the defined area indicated by the last piece of position data. When an intermediate piece of position data indicates a point within a defined area other than the reference area and the last piece of position data indicates a point within the reference area, the operation to be performed is determined based on the combination of directions representing a reciprocal movement between the reference position and the defined area indicated by the intermediate piece of position data.

28 Claims, 19 Drawing Sheets

FOREIGN PATENT DOCUMENTS

| | | |
|---|---|---|
| JP | 2000-010655 | 1/2000 |
| JP | 2000-163193 | 6/2000 |
| JP | 3095145 | 8/2000 |
| JP | 2001-005438 | 1/2001 |
| JP | 2002-91688 A | 3/2002 |
| WO | WO 00/34942 | 6/2000 |

OTHER PUBLICATIONS

Worth, "xstroke: Full-screen Gesture Recognition for X", Proceedings of the Freenix Track: 2003 Usenix Annual Technical Conference, Jun. 9, 2003, pp. 187-196, http://www.usenix.org/events/usenix03/tech/freenix03/full_papers/worth/worth.pdf.

Moyle et al., "A Flick in the Right Direction: An Evaluation of Simple Gesture Based Controls", Nov. 2, 2001, 47 pages.

Mouse Gestures in Opera (available on the internet as of Mar. 15, 2005 at http://www.opera.com/features/mouse/).

Opera FAQ (available on the Internet as of Mar. 15, 2005 at http://dai.pekori.to/opera/faq/mice).

Office Action issued Jul. 9, 2009 in corresponding Japanese Application No. 2005-109987.

* cited by examiner

FIG. 4
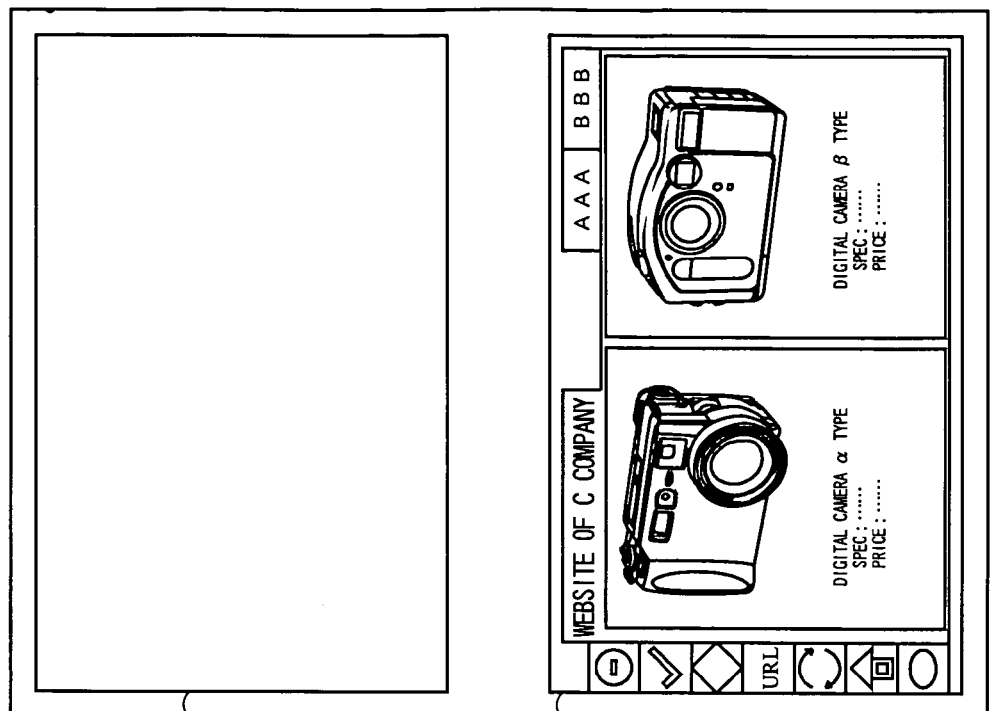
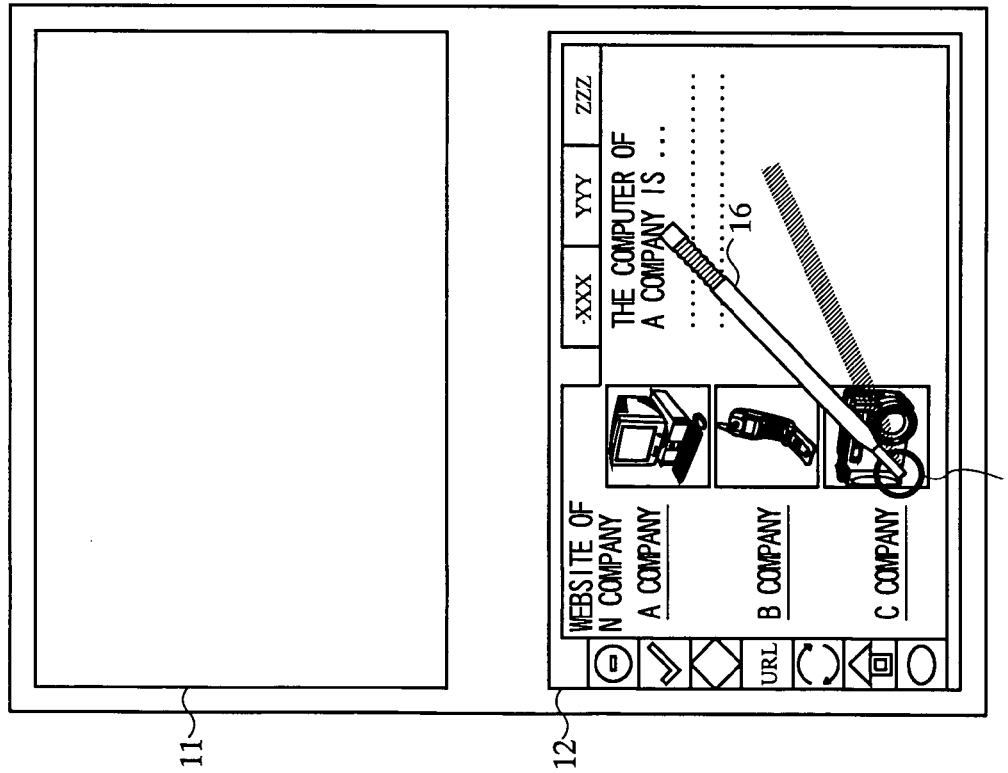

STORAGE MEDIUM STORING INPUT POSITION PROCESSING PROGRAM, AND INPUT POSITION PROCESSING DEVICE

CROSS REFERENCE OF RELATED APPLICATION

The disclosures of Japanese Patent Applications No. 2005-109986 and No. 2005-109987 are incorporated herein by reference.

BACKGROUND

1. Field

Example embodiments of the present invention relates to a storage medium storing an input position processing program and an input position processing device, and more particularly to a storage medium storing an input position processing program and an input position processing device for determining an operation to be performed based on input positions outputted from a pointing device, such as a touch panel, that is capable of outputting position information of a predetermined coordinate system.

2. Description of the Background Art

Techniques for determining an operation to be performed next (hereinafter referred to as the "next operation") based on a series of positions (each represented by a set of X and Y coordinates) inputted by operating a mouse are known in the art. Techniques for performing a display operation by display means based on a series of positions inputted by operating a touch panel or a mouse. For example, web browsers for viewing webpages on the Internet that allow the user to browse with an input method called "mouse gestures" have been proposed in the art, as described in, for example, "Mouse Gestures in Opera" (available on the Internet as of Mar. 15, 2005 at http://www.opera.com/features/mouse/) (hereinafter "Non-Patent Document 1").

With the browser described in Non-Patent Document 1, the user can move to the previous page by moving the mouse pointer leftward in the background area of the webpage while holding down the right button and then releasing the right button. The user can move to the next page by moving the mouse pointer rightward in the background area of the webpage while holding down the right button and then releasing the right button. Moving the mouse pointer downward in the background area of the webpage while holding down the right button and then releasing the right button opens a new window. Moving the mouse pointer downward and then upward in the background area of the webpage while holding down the right button and then releasing the right button duplicates a window.

Right-clicking on a link in a webpage, moving the mouse pointer downward while holding down the right button, and then releasing the right button opens the link in a new window in the foreground. Right-clicking on a link in a webpage, moving the mouse pointer downward and then upward while holding down the right button, and then releasing the right button opens the link in a new window in the background. These are different operations from opening a link in the current window by left-clicking the link.

With the mouse gestures disclosed in Non-Patent Document 1, the next operation is determined based on a direction or a combination of directions indicated by a series of input positions specified through a mouse movement. Thus, these mouse gestures can eliminate the need to point to and click on buttons or toolbars placed around a webpage on the display screen.

With some browsers such as "Sleipnir", a mouse gesture being recognized is displayed on the lower left corner of the screen. For example, directions indicated by a series of input positions specified through a mouse movement are displayed in real time to the user using arrow symbols such as "↑", "↓", "←" and "→" in the order they are recognized. With such a display, the user can expect the next operation.

Moreover, with the mouse gestures disclosed in Non-Patent Document 1, a display operation by display means is performed based on a direction or a combination of directions indicated by a series of input positions specified through a mouse movement.

There are other techniques proposed in the art, as disclosed in, for example, Japanese Patent No. 3095145 (hereinafter "Patent Document 1"), in which a series of input positions inputted by moving a stylus pen on a touch panel is recognized as a "pen trace", wherein the current window is moved to the position where the stylus pen has been moved if the pen trace has no bend therein, and the current window is retracted to a predetermined location if the pen trace has a bend therein.

However, while the browser described in Non-Patent Document 1 works with no problems when the user makes an appropriate stroke in the first place, it presents a problem when the user makes an inappropriate stroke. Specifically, the browser stores a series of input positions specified through a mouse movement, and therefore if the user draws an inappropriate trace and keeps moving the mouse in an attempt to correct the inappropriate trace, it will only accumulate more unintended traces, thus failing to perform a next operation intended by the user. In order for the user to erase the inappropriate trace or traces, the user needs to once release the right mouse button and then hold the right button again to re-draw an intended trace.

It may be possible to determine the next operation based only on a single direction, instead of a combination of directions, indicated by a series of input positions specified through a mouse movement. This however reduces the variety of usable operation gestures to the number of directions to be distinguished from one another. If the number of directions to be distinguished from one another is excessively increased, the angle between two adjacent directions will be so small that the direction intended by the user may often be different from the direction of the user's stroke as recognized by the computer, thereby making the use of gestures more difficult for the user.

A browser of the type in which an operation gesture being recognized is displayed on the lower left corner of the display screen has the following problem. Since a recognized operation gesture is displayed in such an inconspicuous place as the lower left corner of the display screen, it is not readily recognized by the user. Even if it is recognized by the user, the user needs to move the eyes back and force between the portion of interest of the webpage and the lower left corner of the screen, which may be tiresome for the user.

Moreover, some mouse gestures of the browser described in Non-Patent Document 1 may not be intuitive for the user. For example, it may be difficult to establish an intuitive association between the operation of "moving the mouse pointer downward in a background area of the webpage while holding down the right button" and the display operation of "opening a new window". It may also be difficult to establish an intuitive association between the operation of "moving the mouse pointer downward and then upward in a background area of the webpage while holding down the right button" and the display operation of "duplicating a window". Therefore, associations between these mouse gestures and the display operations need to be memorized by the user simply as rules.

The need to memorize such rules detracts from the usefulness of the mouse gesture function.

Similarly, with the technique of Patent Document 1, the association between the touch panel operation in which the user draws a pen trace with a bend therein and the display operation of retracting a window is merely a rule to be memorized, and it is difficult to establish an intuitive association therebetween. It should be noted that even if a user operation and the corresponding display operation can be associated with each other intuitively, it is meaningless if the display operation is not a useful operation. Therefore, it is preferred that a display operation, which can be intuitively associated with a user operation, is in itself an useful operation.

SUMMARY

Therefore, a first aspect of example embodiments of the present invention is to provide a storage medium storing an input position processing program and an input position processing device, which improve the usability of the position input method by simplifying the correction/cancellation of an inappropriate input trace while keeping a desirable variety of operations that can be specified through position inputting operations. A second aspect of example embodiments of the present invention is to provide a storage medium storing an input position processing program and an input position processing device, in which the user can readily perceive an operation gesture being recognized. A third aspect of example embodiments of the present invention is to provide a storage medium storing an input position processing program and an input position processing device, in which useful display operations can be performed intuitively through position inputting operations.

Example embodiments of the present invention may have the following features to attain the aspect mentioned above. Note that reference numerals, step numbers (each including "S" followed by a number), etc., shown in parenthesis below are merely to indicate the correlation between what is described in the following section and what is described in the description of the embodiment set out further below in the present specification, and are in no way intended to restrict the scope of the present invention.

A first aspect of example embodiments of the present invention is directed to a storage medium storing an input position processing program executed by a computer (21) of a device that is operated based on an input position (position data corresponding to the contact point) outputted from a pointing device (15) according to a user operation. The input position processing program instructs the computer to perform an input position detection step (S43, S63, S68, S73, S84, S87, S92, S104, S107, S114, S120, S134, S139, S144), a reference position storage step (S44), an area defining step (FIG. 11), and an operation determining step (S50 to S52). The input position detection step is a step of detecting a series of pieces of position data (DC 1) in a predetermined coordinate system (display screen coordinate system) based on input positions outputted from the pointing device. The reference position storage step is a step of defining a reference position (DC2) based on a first piece of position data among the series of pieces of position data detected in the input position detection step and storing the reference position in a memory (24). The area defining step is a step of defining a plurality of areas (AM, AT, AB, AL, AR) based on the reference position with one of the defined areas being a reference area (AM) in which the reference position is located. The operation determining step is a step of determining an operation to be performed based on a last piece of position data (representing the position upon touch-off) among the series of pieces of position data detected in the input position detection step and the reference position. The operation determining step includes a first operation determining step (S115, S135, S140, S145) and a second operation determining step (S121). The first operation determining step is a step of, when the last piece of position data indicates a point within a defined area (AT, AB, AL, AR) other than the reference area, determining the operation to be performed based on a direction that extends from the reference position to the defined area indicated by the last piece of position data. The second operation determining step is a step of, when an intermediate piece of position data among the series of pieces of position data detected in the input position detection step indicates a point within a defined area other than the reference area (DF8 is ON) and the last piece of position data indicates a point within the reference area, determining the operation to be performed based on a combination of directions, including a direction that extends from the reference position to the defined area indicated by the intermediate piece of position data, and a direction that extends from the defined area indicated by the intermediate piece of position data to the reference position. The pointing device is an input device for specifying a position or coordinates on a display screen, and may be a mouse, a track pad, a track ball, or the like. The coordinate system used with these input devices is the touch panel coordinate system or the display screen coordinate system.

According to a second aspect, in the first aspect, the operation determining step further includes a flag setting step (S112, S132, S137, S142), a first flag updating step (S112, S132, S137, S142) and a second flag updating step (S118). The flag setting step is a step of, when a position indicated by the last piece of position data moves from the reference area into another defined area, setting a flag (DF8, DF10 to DF12) corresponding to the other defined area and storing the flag settings in the memory. The first flag updating step is a step of, when a position indicated by the last piece of position data moves from the defined area for which the flag has been set into yet another defined area other than the reference area after the flag is set in the flag setting step, updating the flag settings so that a flag (DF8, DF10 to DF12) corresponding to the defined area indicated by the last piece of position data is set and storing the flag settings in the memory. The second flag updating step is a step of, when a position indicated by the last piece of position data further moves from the defined area for which the flag has been set into the reference area after the flag is set in the flag setting step or the first flag updating step, updating the flag settings so that a flag (DF9) corresponding to a reciprocal movement between the reference area and the defined area for which the flag has been set is set and storing the flag settings in the memory. The first operation determining step performed by the computer determines the operation to be performed based on the flag settings from the flag setting step or the first flag updating step. The second operation determining step performed by the computer determines the operation to be performed based on the flag settings from the second flag updating step.

According to a third aspect, in the first aspect, the computer is instructed to further perform a display control step (S113, S119, S133, S138, S143). The display control step is a step of displaying, on a display device (12), an indicator (M8 to M12) indicating the direction (upward, downward, leftward, rightward) from the reference position to the defined area indicated by the last piece of position data based on which the operation to be performed is determined in the first operation determining step, and an indicator (M8 to M12) indicating the combination of directions (upward and downward) based on which the operation to be performed is determined in the second operation determining step.

According to a fourth aspect, in the first aspect, the computer is instructed to further perform a display control step. The display control step is a step of displaying, on a display device, an image (M7) indicating the reference area defined in the area defining step.

According to a fifth aspect, in the first aspect, the computer is instructed to further perform a display control step. The display control step is a step of displaying, on a display device, an image based on the coordinate system. The area defining step performed by the computer defines the plurality of areas by dividing an area of the image centered about the reference area into a plurality of pieces.

A sixth aspect of example embodiments of the present invention is directed to a storage medium storing an input position processing program executed by a computer of a device that is operated based on an input position outputted from a pointing device according to a user operation. The input position processing program instructs the computer to perform an input position detection step, a reference position storage step, a first operation determining step, a second operation determining step, and a display control step. The input position detection step is a step of detecting a series of pieces of position data in a predetermined coordinate system based on input positions outputted from the pointing device. The reference position storage step is a step of defining a reference position based on a first piece of position data among the series of pieces of position data detected in the input position detection step and storing the reference position in a memory. The first operation determining step is a step of determining an operation to be performed based on a direction that extends from the reference position to a position indicated by a last piece of position data among the series of pieces of position data detected in the input position detection step. The second operation determining step is a step of determining the operation to be performed based on a combination of directions, including a direction that extends from the reference position to a position indicated by an intermediate piece of position data among the series of pieces of position data detected in the input position detection step, and a direction that extends from the position indicated by the intermediate piece of position data to the reference position. The display control step is a step of displaying, on a display device, an image based on the coordinate system, and displaying, on the image near a position indicated by the last piece of position data, an indicator indicating the direction based on which the operation to be performed is determined in the first operation determining step and an indicator indicating the combination of directions based on which the operation to be performed is determined in the second operation determining step. The meaning of the phrase "near a position indicated by the last piece of position data" as used herein at least includes "at the position indicated by the last piece of position data" and "in areas adjacent to that position".

A seventh aspect of example embodiments of the present invention is directed to an input position processing device that is operated based on an input position outputted from a pointing device according to a user operation. The input position processing device includes storage means (24), input position detection means, reference position storage means, area defining means, and operation determining means. The input position detection means is means for detecting a series of pieces of position data in a predetermined coordinate system based on input positions outputted from the pointing device. The reference position storage means is means for defining a reference position based on a first piece of position data among the series of pieces of position data detected by the input position detection means and storing the reference position in the storage means. The area defining means is means for defining a plurality of areas based on the reference position with one of the defined areas being a reference area in which the reference position is located. The operation determining means is means for determining an operation to be performed based on a last piece of position data among the series of pieces of position data detected by the input position detection means and the reference position. The operation determining means includes first operation determining means and second operation determining means. The first operation determining means is means for, when the last piece of position data indicates a point within a defined area other than the reference area, determining the operation to be performed based on a direction that extends from the reference position to the defined area indicated by the last piece of position data. The second operation determining means is means for, when an intermediate piece of position data among the series of pieces of position data detected by the input position detection means indicates a point within a defined area other than the reference area and the last piece of position data indicates a point within the reference area, determining the operation to be performed based on a combination of directions, including a direction that extends from the reference position to the defined area indicated by the intermediate piece of position data, and a direction that extends from the defined area indicated by the intermediate piece of position data to the reference position.

An eighth aspect of example embodiments of the present invention is directed to an input position processing device that is operated based on an input position outputted from a pointing device according to a user operation. The input position processing device includes storage means, input position detection means, reference position storage means, first operation determining means, second operation determining means, and display control means. The input position detection means is means for detecting a series of pieces of position data in a predetermined coordinate system based on input positions outputted from the pointing device. The reference position storage means is means for defining a reference position based on a first piece of position data among the series of pieces of position data detected by the input position detection means and storing the reference position in the storage means. The first operation determining means is means for determining an operation to be performed based on a direction that extends from the reference position to a position indicated by a last piece of position data among the series of pieces of position data detected by the input position detection means. The second operation determining means is means for determining the operation to be performed based on a combination of directions, including a direction that extends from the reference position to a position indicated by an intermediate piece of position data among the series of pieces of position data detected by the input position detection means, and a direction that extends from the position indicated by the intermediate piece of position data to the reference position. The display control means is means for displaying, on a display device, an image based on the coordinate system, and displaying, on the image near a position indicated by the last piece of position data, an indicator indicating the direction based on which the operation to be performed is determined by the first operation determining means and an indicator indicating the combination of directions based on which the operation to be performed is determined by the second operation determining means.

A ninth aspect of example embodiments of the present invention is directed to a storage medium storing an input position processing program executed by a computer (21) capable of performing a display operation of displaying images separately on a first display section (12 or 11) and a second display section (11 or 12), together forming a display device, based on an input position (position data corresponding to the contact point) outputted from a pointing device (15) according to a user operation. The input position processing program instructs the computer to perform an input position storage step (S43, S63, S68, S73, S84, S87, S92, S104, S107, S114, S120, S134, S139, S144), a reference position storage step (S44), a processing step (S69, S88, S115, S135), and a display control step (S69, S88, S115, S135). The input position storage step is a step of detecting a series of pieces of position data (DC1) in a display coordinate system (display screen coordinate system) of an image displayed on the display device based on input positions outputted from the pointing device, and storing the position data in a memory (24). The reference position storage step is a step of defining, as a reference position (DC2), a first piece of position data among the series of pieces of position data stored in the input position storage step, and storing the setting in the memory. The processing step is a step of obtaining a display image (a response image corresponding to a tab or a link, or an image displayed on the first LCD 11 or the second LCD 12) based on at least one piece of position data among the series of pieces of position data. The display control step is a step of, when an operation direction indicated by the series of pieces of position data in the display coordinate system with respect to the reference position indicates a reference direction (upward or downward) that extends from a position of the first display section toward a position of the second display section ("Yes" in S65, "Yes" in S83, "Yes" in S111, "Yes" in S131), displaying the display image obtained in the processing step on the second display section (FIG. 5, FIG. 7, FIG. 10). The display image obtained in the processing step includes a response image corresponding to a tab or a link, at least a portion of an image displayed on the first display section, etc. The pointing device is an input device for specifying a position or coordinates on a display screen, and may be a touch panel, a mouse, a track pad, a track ball, or the like. The coordinate system used with these input devices is the touch panel coordinate system or the display screen coordinate system. The first display section and the second display section may be two physically separate display sections, or may be obtained by dividing a physically single display screen in two areas. The arrangement of the first and second display sections may be a horizontally-split arrangement or a vertically-split arrangement.

According to a tenth aspect, in the ninth aspect, the computer performs, based on the input position, a display process of a web browser for downloading a file via a communications section (33) capable of communicating with a network and displaying the file on the display device. When the reference position is located within an active area (a tab, a link) of the web browser ("Yes" in S46, "Yes" in S47), the processing step performed by the computer obtains a response image corresponding to the active area. When the operation direction indicates the reference direction, the display control step performed by the computer displays the response image on the second display section (FIG. 5, FIG. 7).

According to an eleventh aspect, in the tenth aspect, when the reference position is located within a background area of the web browser ("Yes" in S48), the processing step performed by the computer obtains at least a portion of an image displayed on the first display section (an image displayed on the second LCD 12 or the first LCD 11). When the operation direction indicates the reference direction, the display control step performed by the computer displays the at least a portion of an image displayed on the first display section on the second display section (FIG. 10).

According to a twelfth aspect, in the tenth aspect, the reference direction is an upward direction or a downward direction in which the second display section of the display device is provided with respect to the first display section of the display device. When the reference position is located within a background area of the web browser and the operation direction indicates a leftward direction or a rightward direction, the processing step performed by the computer obtains a previous image that was obtained previously in the processing step. When the operation direction indicates a leftward direction or a rightward direction ("Yes" in S136, "Yes" in S141), the display control step performed by the computer displays the previous image on the first display section (S140, S145).

According to a thirteenth aspect, in the ninth aspect, when a trace (DC3) represented by the series of pieces of position data substantially encircles a predetermined area of an image displayed on the first display section ("Yes" in S103), the processing step performed by the computer obtains an enlarged image by enlarging a portion of the image within the predetermined area (S108). The display control step performed by the computer displays the enlarged image on the second display section (FIG. 9).

According to a fourteenth aspect, in the ninth aspect, the reference direction is an upward direction or a downward direction in which the second display section of the display device is provided with respect to the first display section of the display device. When the operation direction indicates a leftward direction or a rightward direction, the processing step performed by the computer obtains an image of a different page from a current page being displayed on the first display section. When the operation direction indicates a leftward direction or a rightward direction, the display control step performed by the computer displays the image of the different page on the first display section.

According to a fifteenth aspect, in the ninth aspect, the position data in the display coordinate system based on input positions outputted from the pointing device can be defined only on one of an image displayed on the first display section and an image displayed on the second display section.

A sixteenth aspect of example embodiments of the present invention is directed to a storage medium storing an input position processing program executed by a computer capable of performing a display operation of displaying images separately on a first display section and a second display section, together forming a display device, based on an input position outputted from a pointing device according to a user operation. The input position processing program instructs the computer to perform an input position storage step, a reference position storage step, a processing step (S74, S93, S121), and a display control step (S74, S93, S121). The input position storage step is a step of detecting a series of pieces of position data in a display coordinate system of an image displayed on the display device based on input positions outputted from the pointing device, and storing the position data in a memory. The reference position storage step is a step of defining, as a reference position, a first piece of position data among the series of pieces of position data stored in the input position storage step, and storing the setting in the memory. The processing step is a step of obtaining a display image based on at least one piece of position data among the series of pieces of position data. The display control step is a step of, when an operation direction indicated by the series of pieces of position data in the display coordinate system with respect to the reference position indicates a reciprocal movement (up-and-down movement) along a direction in which the first display section and the second display section are arranged with respect to each other ("Yes" in S70, "Yes" in S89, "Yes" in S116 and S117), displaying the display image obtained in the processing step on the second display section while at least a portion of an image displayed on the second display section is displayed on the first display section (FIG. 6, FIG. 8, FIG. 12). The display image obtained in the processing step includes a response image, at least a portion of an image displayed on the first display section, etc.

A seventeenth aspect of example embodiments of the present invention is directed to a storage medium storing an input position processing program executed by a computer capable of performing a display operation of displaying images separately on a first display section and a second display section, together forming a display device, based on an input position outputted from a pointing device according to a user operation. The input position processing program instructs the computer to perform an input position storage step, a reference position storage step, a processing step (S74, S93, S121), and a display control step (S74, S93, S121). The input position storage step is a step of detecting a series of pieces of position data in a display coordinate system of an image displayed on the display device based on input positions outputted from the pointing device, and storing the position data in a memory. The reference position storage step is a step of defining, as a reference position, a first piece of position data among the series of pieces of position data stored in the input position storage step, and storing the setting in the memory. The processing step is a step of obtaining a display image based on at least one piece of position data among the series of pieces of position data. The display control step is a step of, when an operation direction indicated by the series of pieces of position data in the display coordinate system with respect to the reference position indicates a reference direction that extends from a position of the first display section toward a position of the second display section, displaying the display image obtained in the processing step on the second display section. The display control step is a step of, when the operation direction indicates a reciprocal movement along a direction in which the first display section and the second display section are arranged with respect to each other, displaying the display image obtained in the processing step on the second display section while at least a portion of an image displayed on the second display section is displayed on the first display section.

An eighteenth aspect of example embodiments of the present invention is directed to an input position processing device capable of performing a display operation of displaying images separately on a first display section and a second display section, together forming a display device, based on an input position outputted from a pointing device according to a user operation. The input position processing device includes storage means (24), input position storage means, reference position storage means, processing means, and display control means. The input position storage means is means for detecting a series of pieces of position data in a display coordinate system of an image displayed on the display device based on input positions outputted from the pointing device, and storing the position data in the storage means. The reference position storage means is means for defining, as a reference position, a first piece of position data among the series of pieces of position data stored by the input position storage means, and storing the setting in the storage means. The processing means is means for obtaining a display image based on at least one piece of position data among the series of pieces of position data. The display control means is means for, when an operation direction indicated by the series of pieces of position data in the display coordinate system with respect to the reference position indicates a reference direction that extends from a position of the first display section toward a position of the second display section, displaying the display image obtained by the processing means on the second display section.

A nineteenth aspect of example embodiments of the present invention is directed to an input position processing device capable of performing a display operation of displaying images separately on a first display section and a second display section, together forming a display device, based on an input position outputted from a pointing device according to a user operation. The input position processing device includes storage means, input position storage means, reference position storage means, processing means, and display control means. The input position storage means is means for detecting a series of pieces of position data in a display coordinate system of an image displayed on the display device based on input positions outputted from the pointing device, and storing the position data in the storage means. The reference position storage means is means for defining, as a reference position, a first piece of position data among the series of pieces of position data stored by the input position storage means, and storing the setting in the storage means. The processing means is means for obtaining a display image based on at least one piece of position data among the series of pieces of position data. The display control means is means for, when an operation direction indicated by the series of pieces of position data in the display coordinate system with respect to the reference position indicates a reciprocal movement along a direction in which the first display section and the second display section are arranged with respect to each other, displaying the display image obtained by the processing means on the second display section while at least a portion of an image displayed on the second display section is displayed on the first display section.

A twentieth aspect of example embodiments of the present invention is directed to an input position processing device capable of performing a display operation of displaying images separately on a first display section and a second display section, together forming a display device, based on an input position outputted from a pointing device according to a user operation. The input position processing device includes storage means, input position storage means, reference position storage means, processing means, and display control means. The input position storage means is means for detecting a series of pieces of position data in a display coordinate system of an image displayed on the display device based on input positions outputted from the pointing device, and storing the position data in the storage means. The reference position storage means is means for defining, as a reference position, a first piece of position data among the series of pieces of position data stored by the input position storage means, and storing the setting in the storage means. The processing means is means for obtaining a display image based on at least one piece of position data among the series of pieces of position data. The display control means is means for, when an operation direction indicated by the series of pieces of position data in the display coordinate system with respect to the reference position indicates a reference direction that extends from a position of the first display section toward a position of the second display section, displaying the display image obtained by the processing means on the second display section, and when the operation direction indicates a reciprocal movement along a direction in which the first display section and the second display section are arranged with respect to each other, displaying the display image obtained by the processing means on the second display section while at least a portion of an image displayed on the second display section is displayed on the first display section.

According to the first aspect, in the second operation determining step, an operation to be performed is determined by recognizing an operation gesture inputted by the user with a combination operation directions based on inputs through the pointing device. Therefore, there is a wider variety of operations that can be specified by operation gestures than when each operation gesture is distinguished from others by a single operation direction. On the other hand, in the first operation determining step, an operation gesture recognized based on an operation direction can easily be canceled by further moving a stylus into another defined area other than the reference area, whereby only the operation direction from the reference position to the other defined area is recognized as a valid operation gesture. Therefore, the user can easily cancel any inappropriate operation and then instruct an new, intended operation in a single continuous operation. Thus, example embodiments of the present invention improves the usability of the position input method as it increases the variety of operations to be performed that can be specified through position inputting operations while reducing problems that may occur when the user draws an inappropriate trace.

According to the second aspect, flags are used to register entries/exits into/out of a plurality of defined areas, whereby an operation gesture being made by the user can be more easily determined, as compared with a case where it is determined based on all input positions.

According to the third aspect, an indicator indicating a recognized operation gesture based on a user's position inputting operation is displayed, whereby the user can readily perceive the operation gesture being inputted and the next operation to be performed.

According to the fourth aspect, a reference area with respect to which different operation gestures are distinguished from one another is displayed, whereby the user can make a valid operation using the pointing device based on the displayed image of the reference area.

According to the fifth aspect, a plurality of areas are defined by dividing the surrounding area centered about the reference area into pieces, based on which operation directions can be distinguished from one another. Therefore, an operation direction with respect to the reference position can easily be distinguished from others.

According to the sixth aspect, an indicator image indicating a recognized operation gesture based on a user's position inputting operation is displayed near the currently touched point, whereby the user can readily perceive the operation gesture being inputted and the next operation to be performed.

According to the ninth aspect, the user can specify useful display operations through intuitive operations using a pointing device. For example, when the user moves the pointing device in a direction that extends from the first display section toward the second display section, the image obtained in the processing step (a response image corresponding to a tab or a link, or at least a portion of an image displayed on the first display section) is displayed on the second display section, whose location corresponds to the operation direction (extending from the first display section toward the second display section). Thus, there is an intuitive association between the operation direction specified by the user using the pointing device and the corresponding display operation. Moreover, the capability of displaying information content obtained through a particular process on the second display section while keeping the original displayed content on the first display section may be useful in various situations.

According to the tenth aspect, in the display process of a web browser, a response image obtained by selecting a tab or a link can be displayed on the second display section, whose location corresponds to the operation direction.

According to the eleventh aspect, in the display process of a web browser, the image displayed on the first display section can be displayed on the second display section, whose location corresponds to the operation direction.

According to the twelfth aspect, in the display process of a web browser, the user can specify a display operation equivalent to a so-called "go back" or "go forward" operation, which is typically represented by a leftward or rightward direction, by moving the pointing device in a leftward or rightward direction, which is different from the reference direction.

According to the thirteenth aspect, the user can substantially encircle a portion of an image displayed on the first display section so as to display the intended portion of the image on an enlarged scale on the second display section.

According to the fourteenth aspect, the user can specify a display operation equivalent to a so-called "previous page" or "next page" operation, which is typically represented by a leftward or rightward direction in electronic books, and the like, by moving the pointing device in a leftward or rightward direction, which is different from the reference direction.

According to the fifteenth aspect, the user can operate one display section on which operations can be inputted so as to specify a display process on the other display section on which operations cannot be inputted.

According to the sixteenth aspect, the user can specify useful display operations through intuitive operations using a pointing device. For example, when the user moves the pointing device in a reciprocal movement along a direction in which the first display section and the second display section are arranged with respect to each other, at least a portion of an image displayed on second display section is displayed on the first display section, whose location corresponds to the direction of one of the first and second movements of the reciprocal movement (e.g., the direction extending from the second display section toward the first display section), while the image obtained in the processing step (a response image corresponding to a tab or a link, or at least a portion of an image displayed on the first display section) is displayed on the second display section, whose location corresponds to the direction of the other one of the first and second movements of the reciprocal movement (e.g., the direction extending from the first display section toward the second display section). This switches around the information content displayed on the display sections, which are arranged along the direction of the user's reciprocal movement of the pointing device (i.e., the direction along which the first display section and the second display section are arranged with respect to each other). Thus, there is an intuitive association between the operation direction specified by the user using the pointing device and the corresponding display operation. Moreover, the capability of displaying information content obtained through a particular process on the second display section while keeping the original displayed content on the first display section may be useful in various situations.

According to the seventeenth aspect, effects similar to those of the ninth and sixteenth aspects can be obtained.

With the input position processing device of example embodiments of the present invention, effects similar to those of the storage medium storing an input position processing program can be obtained.

These and other, features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 4 shows exemplary screen images displayed on the first LCD 11 and the second LCD 12 when a touch panel 15 is tapped on a link displayed on the second LCD 12;

DESCRIPTION OF THE EXAMPLE EMBODIMENTS

Figure 1:
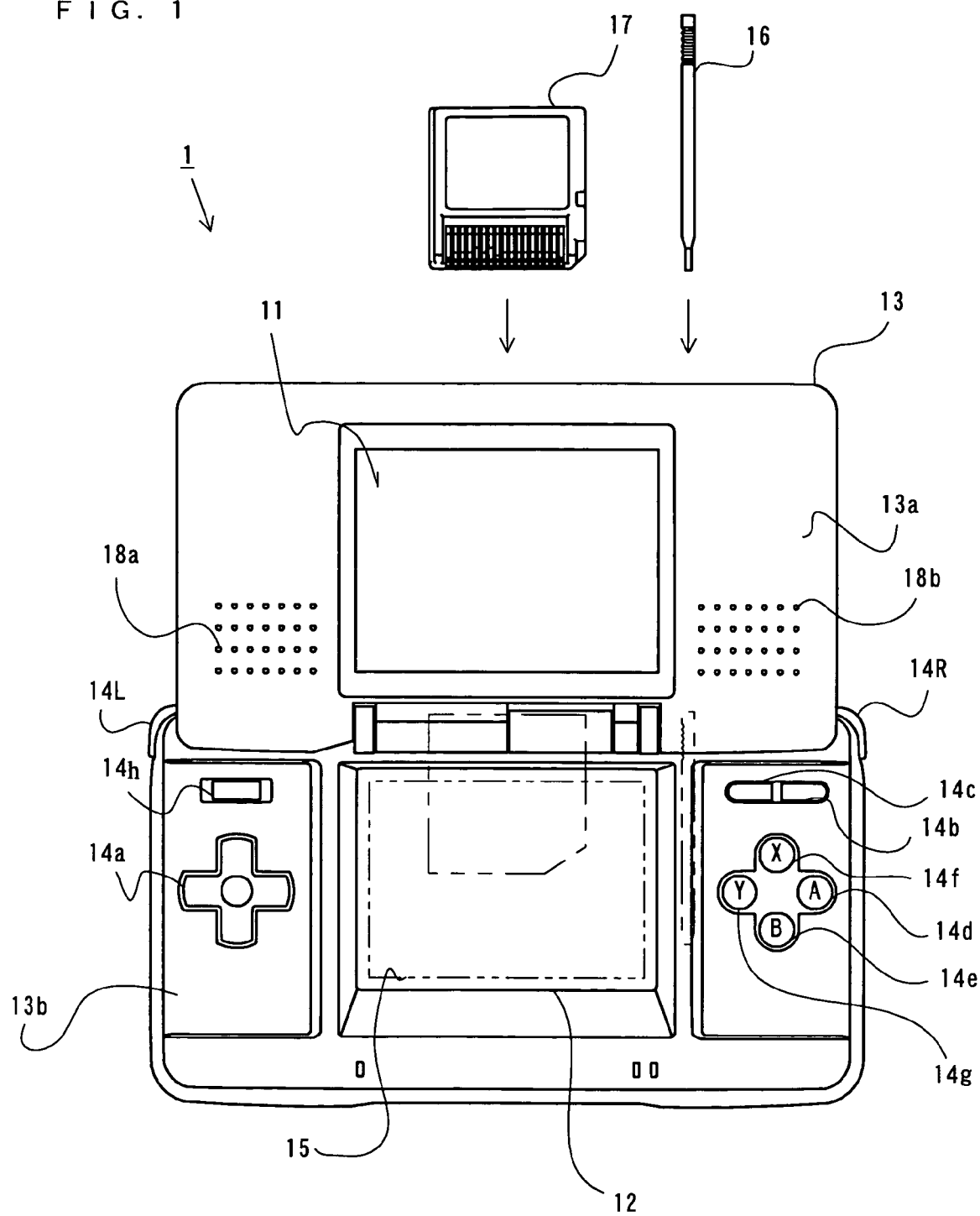
FIG. 1 generally shows a video game device 1 capable of executing an input position processing program of an example embodiment of the present invention.

An input position processing device capable of executing an input position processing program according to an example embodiment of the present invention will now be described with reference to the drawings. While the input position processing program of the example embodiment of the present invention can be executed under any computer system capable of displaying images on a display device, the following description is directed to an input position processing program being executed by a video game device 1 as an example of an information processing device (input position processing device). FIG. 1 generally shows the video game device 1 capable of executing the input position processing program of an example embodiment of the present invention. Although the type of the video game device is not limited to any particular type, the video game device 1 herein is a portable video game device.

Referring to FIG. 1, the video game device 1 includes a first LCD (Liquid Crystal Display) 11 and a second LCD 12. A housing 13 includes an upper housing 13a accommodating the first LCD 11, and a lower housing 13b accommodating the second LCD 12. The first LCD 11 and the second LCD 12 both have a resolution of 256×192 dots. While LCDs are used in the present embodiment, the display device may be of any other suitable type, e.g., an EL (Electro Luminescence) display device. Moreover, the resolution of the first LCD 11 and the second LCD 12 is not limited to the particular resolution used herein.

The upper housing 13a includes sound slits 18a and 18b therein for allowing the sound from a pair of speakers (30a and 30b in FIG. 2) to be described later to pass therethrough.

The lower housing 13b includes a set of input devices, including a cross-shaped switch 14a, a start switch 14b, a select switch 14c, an A button 14d, a B button 14e, an X button 14f, a Y button 14g, a power switch 14h, an L button 14L and an R button 14R. Another input device is a touch panel 15 attached on the screen of the second LCD 12. The lower housing 13b includes slots for accommodating a memory card 17 and a stylus 16.

The touch panel 15 may be any of various types of touch-sensitive panels, including a resistive film touch panel, an optical (infrared) touch panel and a capacitance-coupling touch panel. The touch panel 15 is an example of a pointing device capable of outputting position data corresponding to the contact point on the surface thereof, at which it is being touched with the stylus 16. While it is assumed herein that the user uses the stylus 16 to operate the touch panel 15, it is understood that the touch panel 15 may be operated with a pen (stylus pen) or a fingertip instead of the stylus 16. In the present embodiment, the touch panel 15 has a resolution (detection precision) of 256×192 dots, which is equal to the resolution of the second LCD 12. Note however that it is not necessary that the resolution of the touch panel 15 is equal to that of the second LCD 12.

The memory card 17 is a storage medium storing the input position processing program, etc., and is received by the slot in the lower housing 13b.

Figure 2:
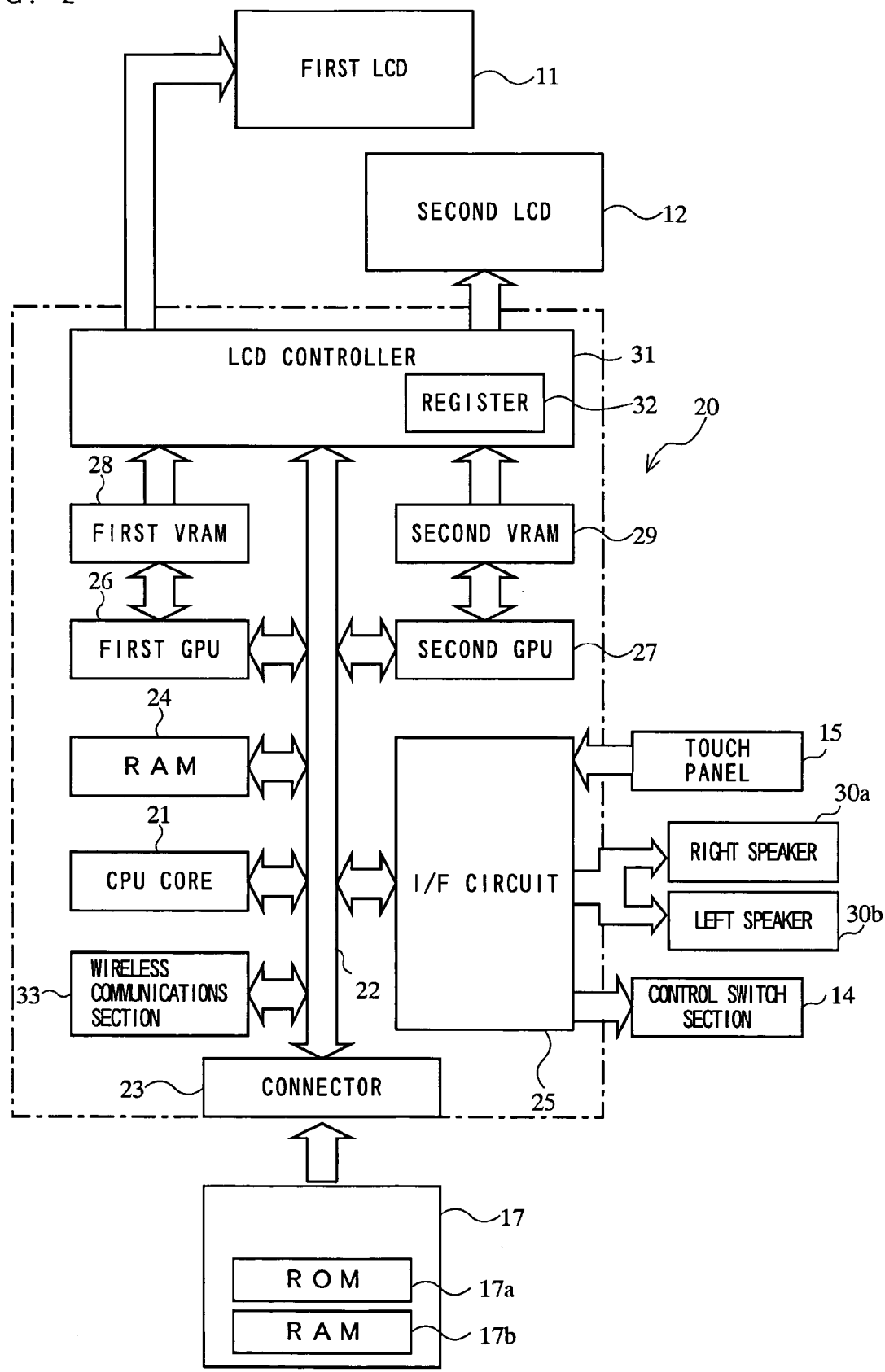
FIG. 2 is a block diagram showing an internal configuration of the video game device 1 of FIG. 1.

Referring now to FIG. 2, an internal configuration of the video game device 1 will be described. FIG. 2 is a block diagram showing the internal configuration of the video game device 1.

Referring to FIG. 2, a CPU core 21 is mounted on an electronic circuit board 20 accommodated in the housing 13. The CPU core 21 is connected to a connector 23, an input/output interface circuit (referred to simply as an "I/F circuit") 25, a first GPU (Graphics Processing Unit) 26, a second GPU 27, a RAM 24, an LCD controller 31 and a wireless communications section 33, via a bus 22. The connector 23 can receive the memory card 17. The memory card 17 includes therein a ROM 17a storing an input position processing program, and a RAM 17b rewritably storing backup data. The input position processing program stored in the ROM 17a of the memory card 17 is loaded to the RAM 24, and the loaded input position processing program is executed by the CPU core 21. In addition to the input position processing program, the RAM 24 also stores temporary data produced while the CPU core 21 is running a program. The I/F circuit 25 is connected to the touch panel 15, a right speaker 30a, a left speaker 30b, and a control switch section 14 of FIG. 1 including the cross-shaped switch 14a and the A button 14d. The right speaker 30a and the left speaker 30b are placed behind the sound slits 18a and 18b, respectively.

A first VRAM (Video RAM) 28 is connected to the first GPU 26, and a second VRAM 29 is connected to the second GPU 27. In response to an instruction from the CPU core 21, the first GPU 26 produces a first display image and renders it on the first VRAM 28, based on data stored in the RAM 24 for producing display images. Similarly, the second GPU 27 produces a second display image and renders it on the second VRAM 29 in response to an instruction from the CPU core 21. The first VRAM 28 and the second VRAM 29 are connected to the LCD controller 31.

The LCD controller 31 includes a register 32. The register 32 stores a value of 0 or 1 in response to an instruction from the CPU core 21. When the value stored in the register 32 is 0, the LCD controller 31 outputs the first display image rendered on the first VRAM 28 to the first LCD 11 and outputs the second display image rendered on the second VRAM 29 to the second LCD 12. When the value stored in the register 32 is 1, the LCD controller 31 outputs the first display image rendered on the first VRAM 28 to the second LCD 12 and outputs the second display image rendered on the second VRAM 29 to the first LCD 11.

The wireless communications section 33 exchanges data used in a game process or other data with that of another video game device, and provides a wireless communications function in compliance with the IEEE 802.11 wireless LAN standard, for example. The wireless communications section 33 outputs received data to the CPU core 21. The wireless communications section 33 transmits data to another video game device, as instructed by the CPU core 21. If a communications protocol such as TCP/IP (Transmission Control Protocol/Internet Protocol) and a predetermined browser are provided in the storage section inside the wireless communications section 33 or the video game device 1, the video game device 1 can be connected to a network such as the Internet via the wireless communications section 33. Then, the video game device 1 can download information content such as text and graphics that are laid open to the public on the network, which can then be viewed on the first LCD 11 and the second LCD 12.

Note that the input position processing program of example embodiments of the present invention may be supplied to the computer system via a wired or wireless communications line, instead of via an external storage medium such as the memory card 17. Alternatively, the input position processing program may be pre-stored in a non-volatile storage device inside the computer system. The information storage medium for storing the input position processing program is not limited to a non-volatile semiconductor memory, but may alternatively be a CD-ROM, a DVD or any other suitable type of an optical disk medium.

Figure 3:
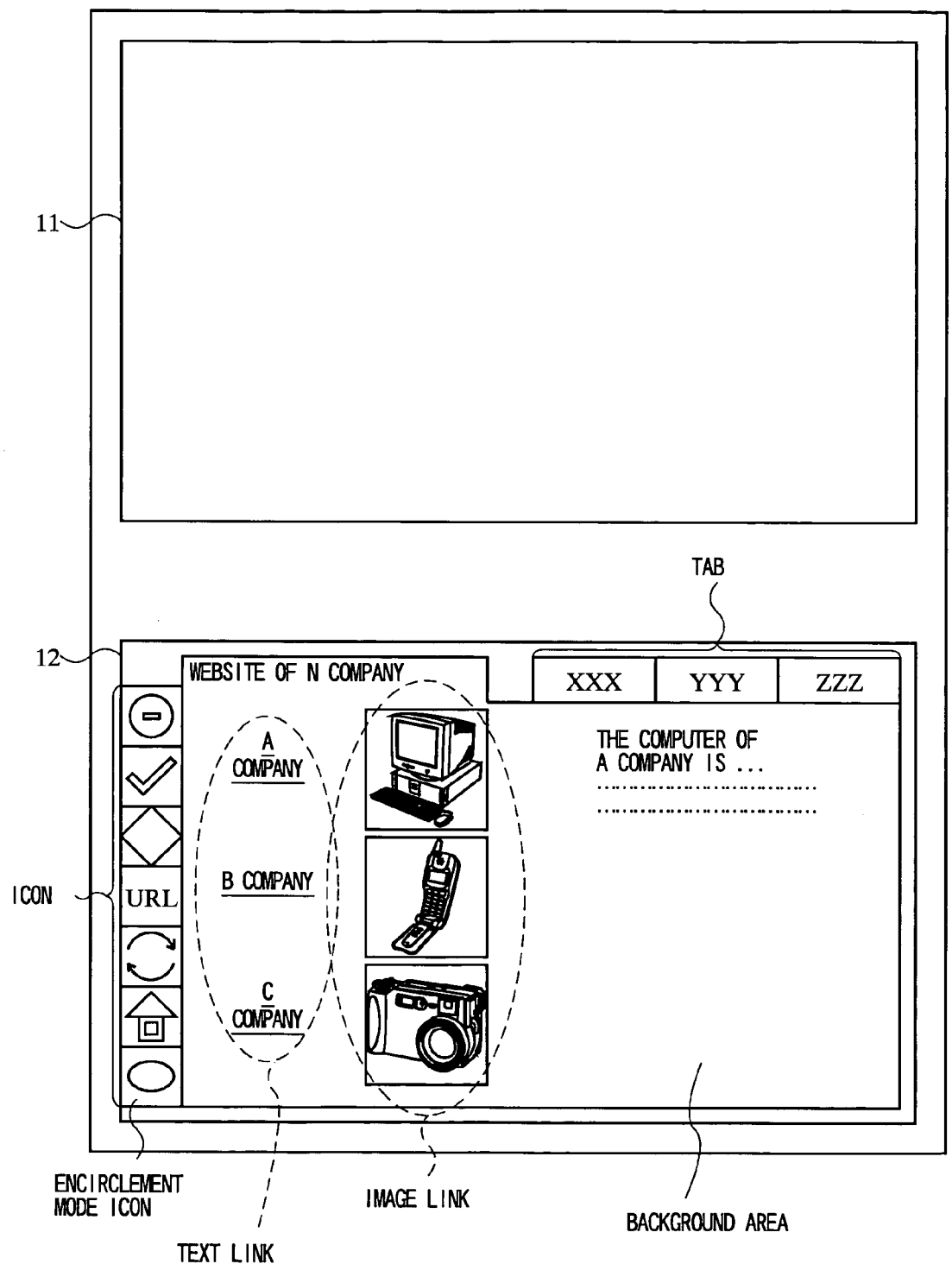
FIG. 3 shows exemplary screen images initially displayed on a first LCD 11 and a second LCD 12.
Figure 5:
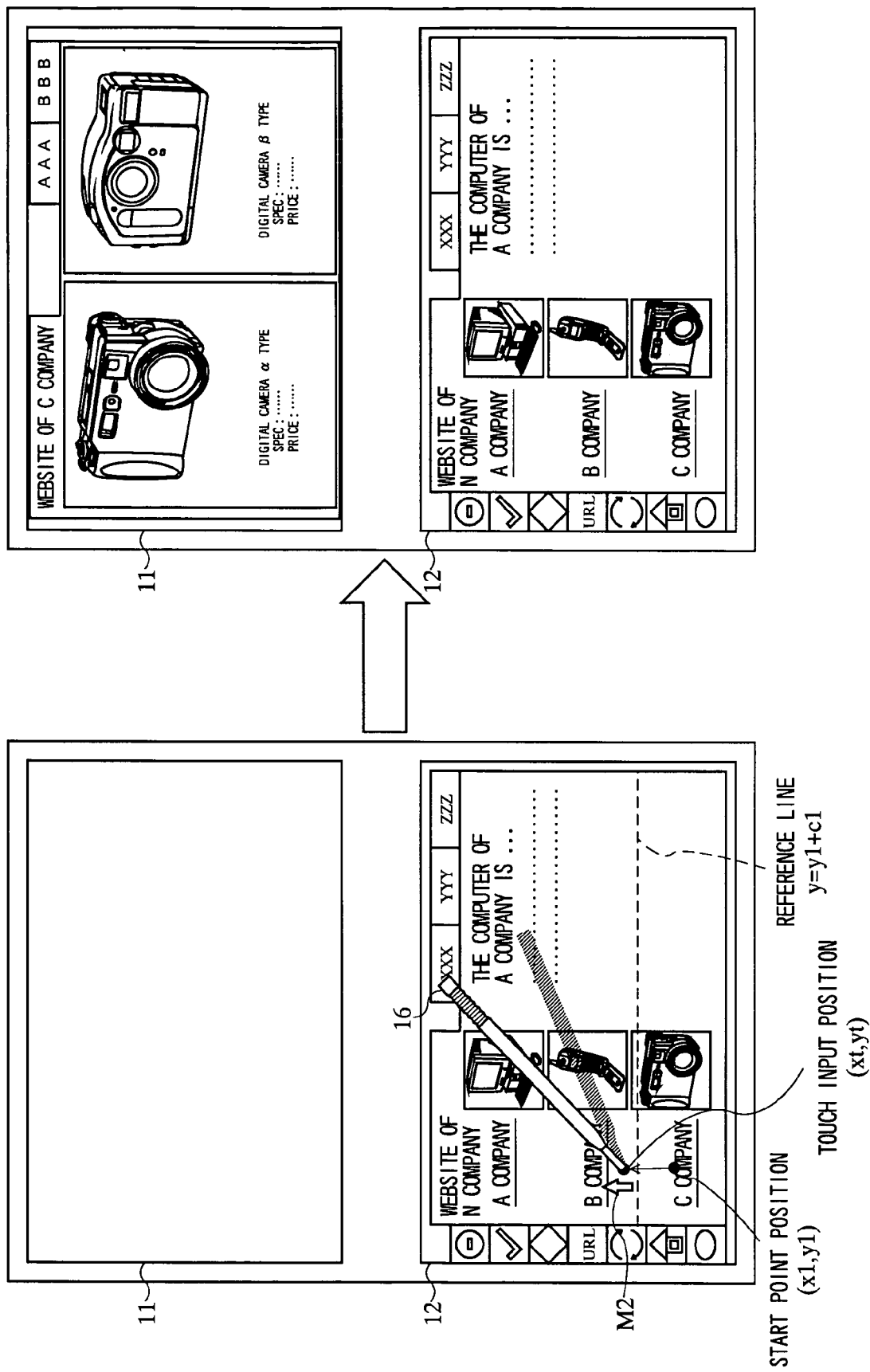
FIG. 5 shows exemplary screen images displayed on the first LCD 11 and the second LCD 12 when the stylus is slid on the touch panel 15 upward from a link displayed on the second LCD 12.
Figure 6:
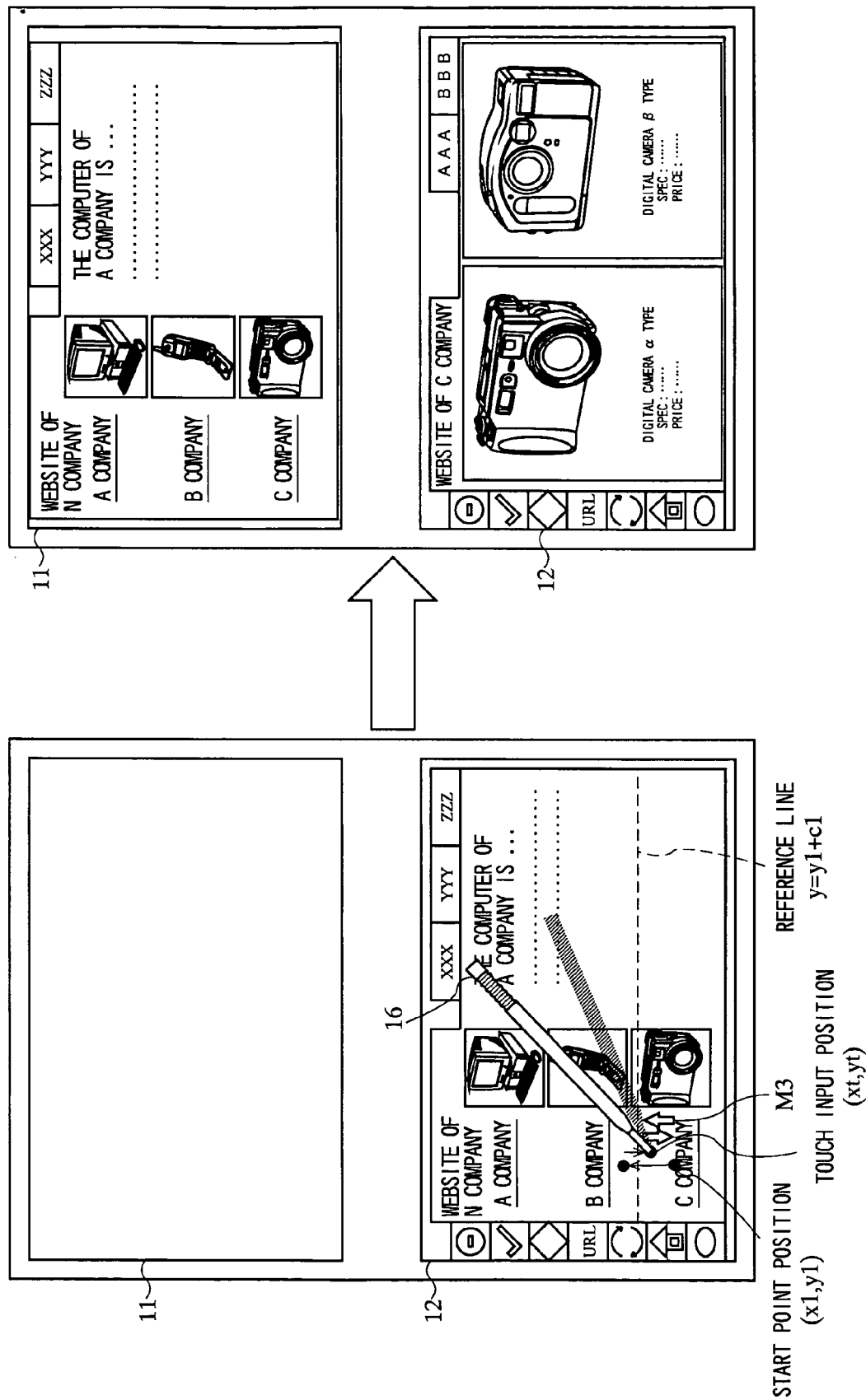
FIG. 6 shows exemplary screen images displayed on the first LCD 11 and the second LCD 12 when the stylus is slid on the touch panel 15 upward from a link displayed on the second LCD 12 and then back downward.
Figure 7:
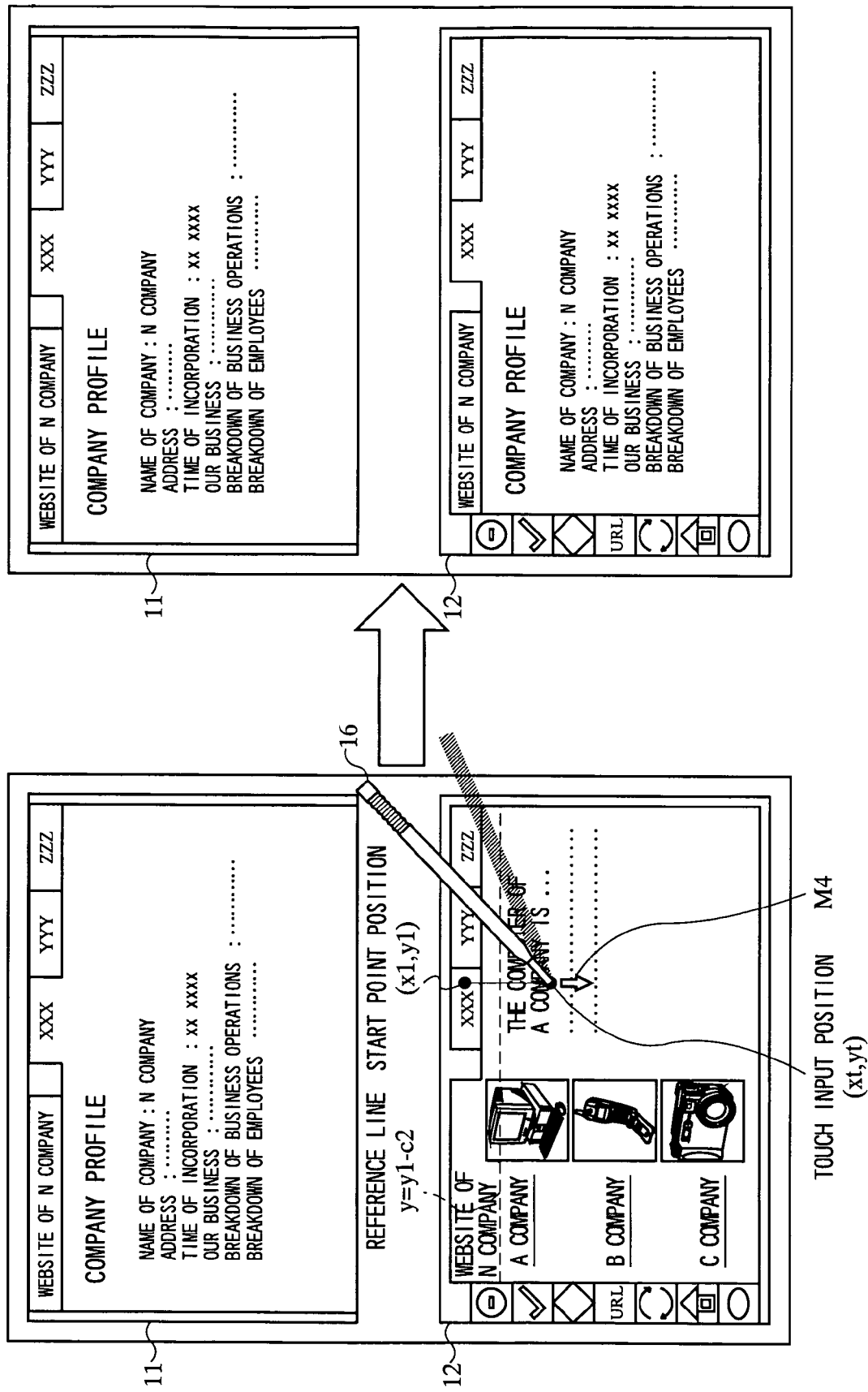
FIG. 7 shows exemplary screen images displayed on the first LCD 11 and the second LCD 12 when the stylus is slid on the touch panel 15 downward from a tab displayed on the second LCD 12.
Figure 8:
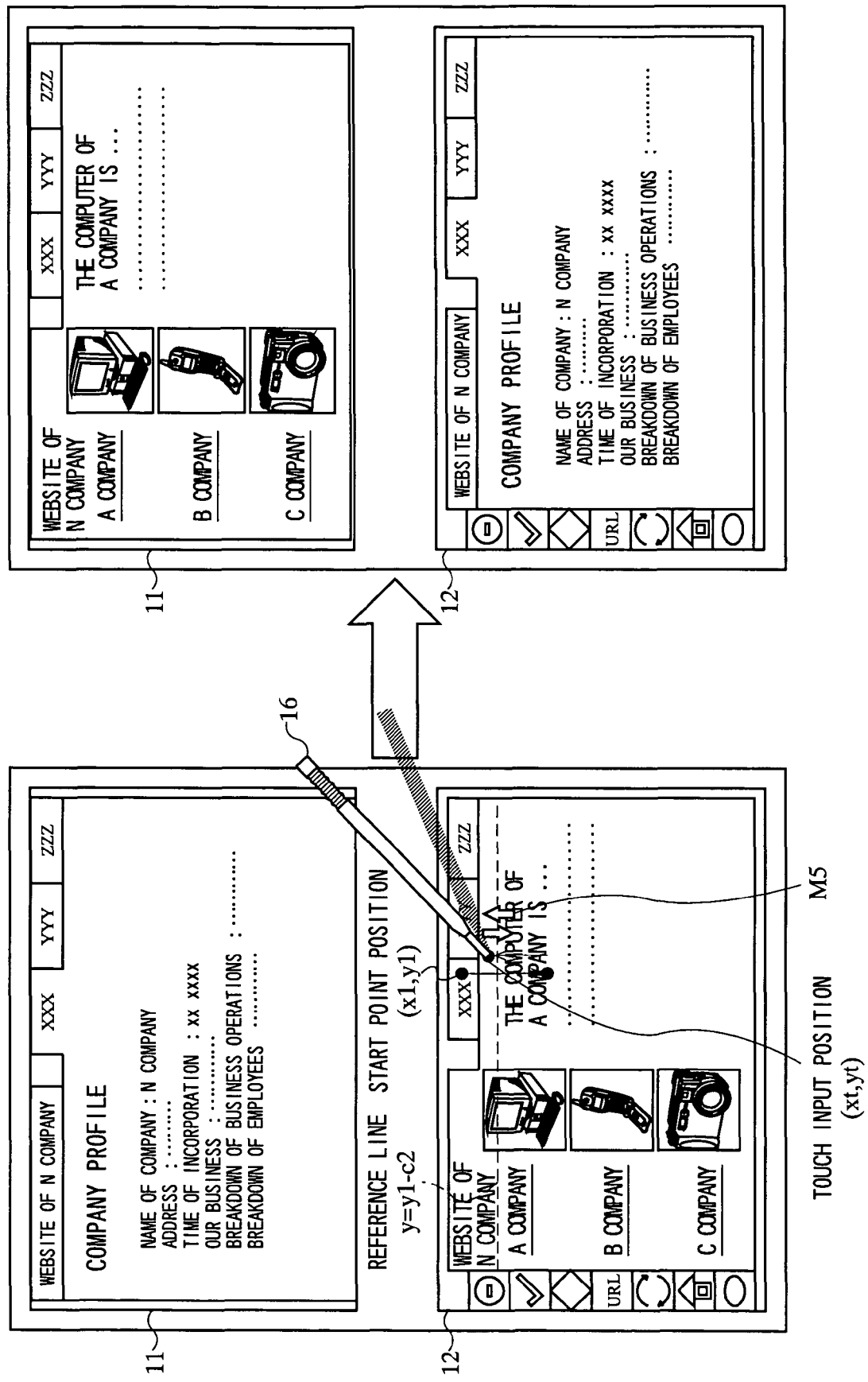
FIG. 8 shows exemplary screen images displayed on the first LCD 11 and the second LCD 12 when the stylus is slid on the touch panel 15 downward from a tab displayed on the second LCD 12 and then back upward.
Figure 9:
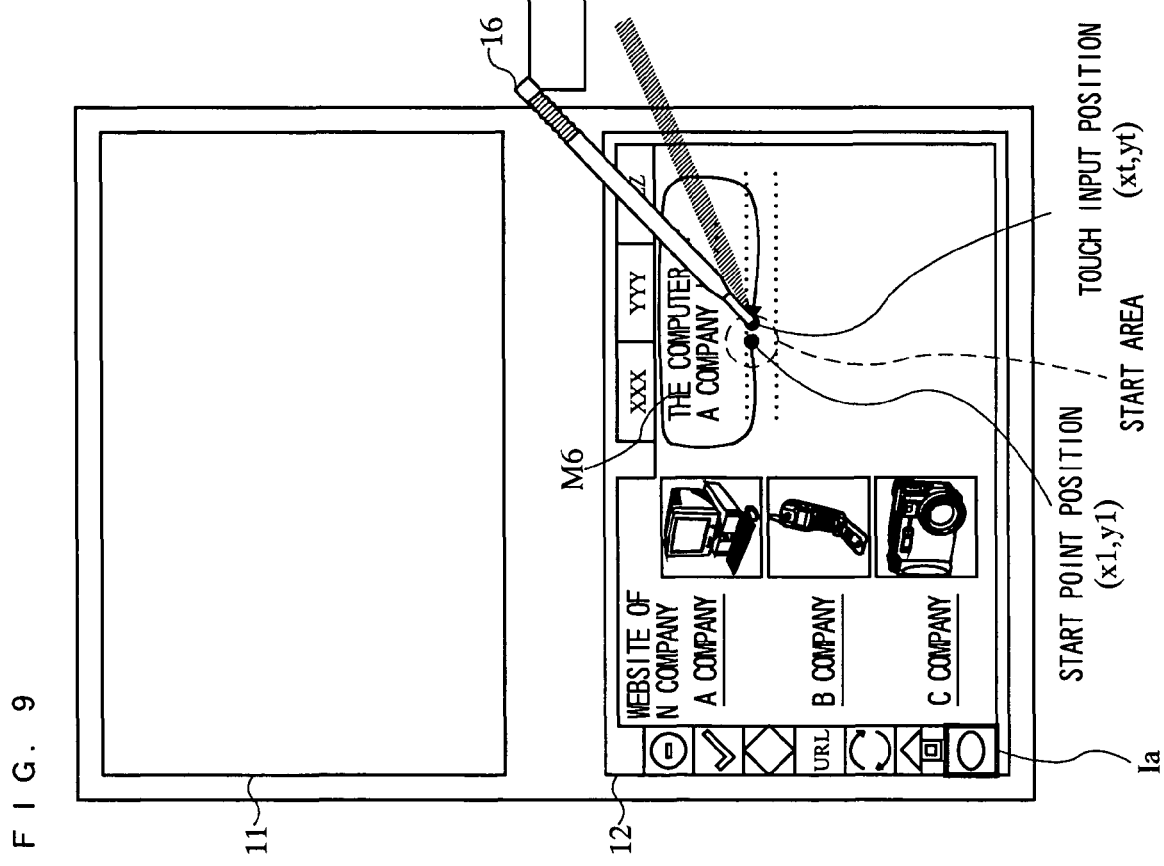
FIG. 9 shows exemplary screen images displayed on the first LCD 11 and the second LCD 12 when the stylus is slid on the touch panel 15 so as to substantially encircle a portion of the information content displayed on the second LCD 12.
Figure 10:
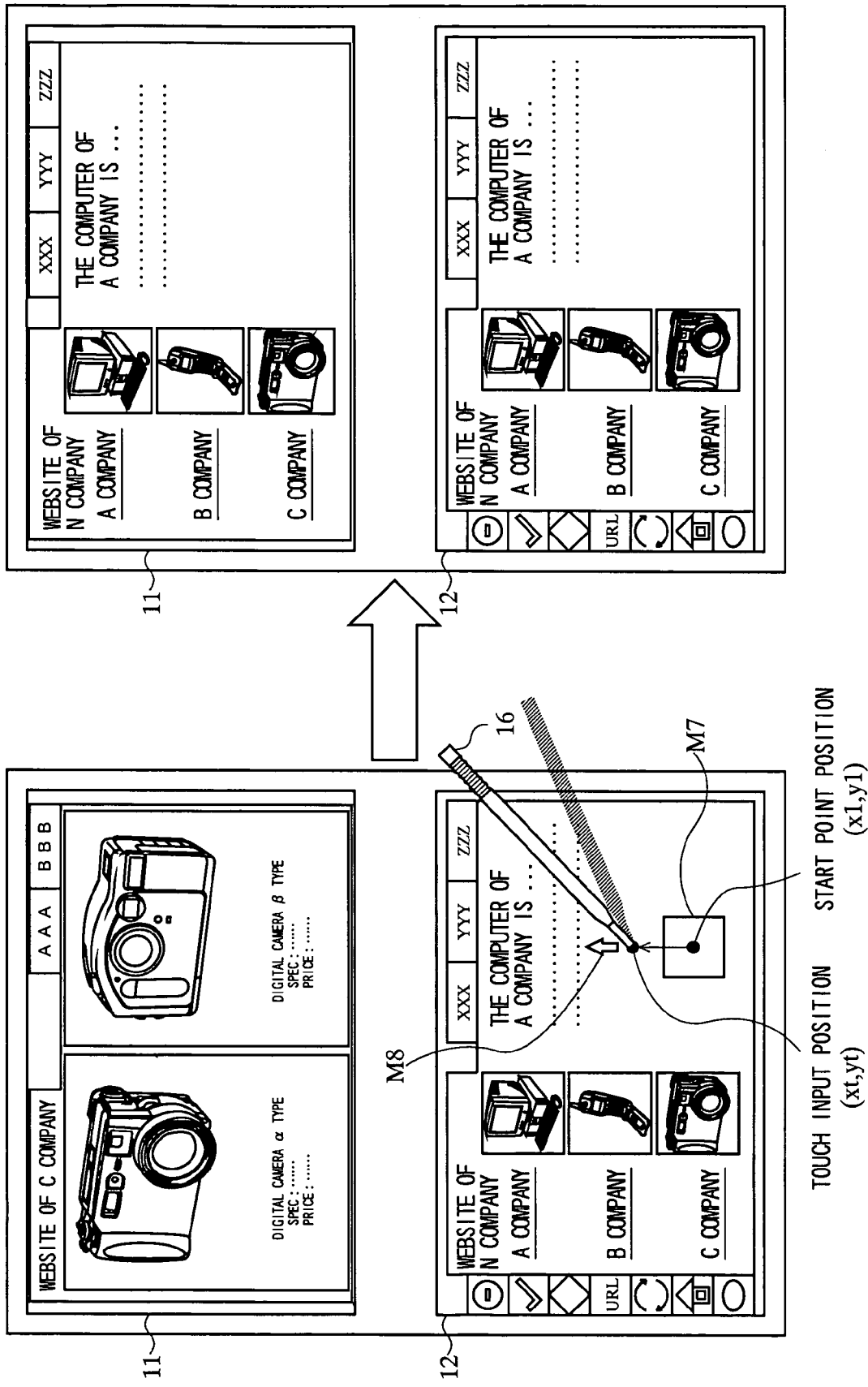
FIG. 10 shows exemplary screen images displayed on the first LCD 11 and the second LCD 12 when the stylus is slid on the touch panel 15 upward from a point on the background image displayed on the second LCD 12.
Figure 11:
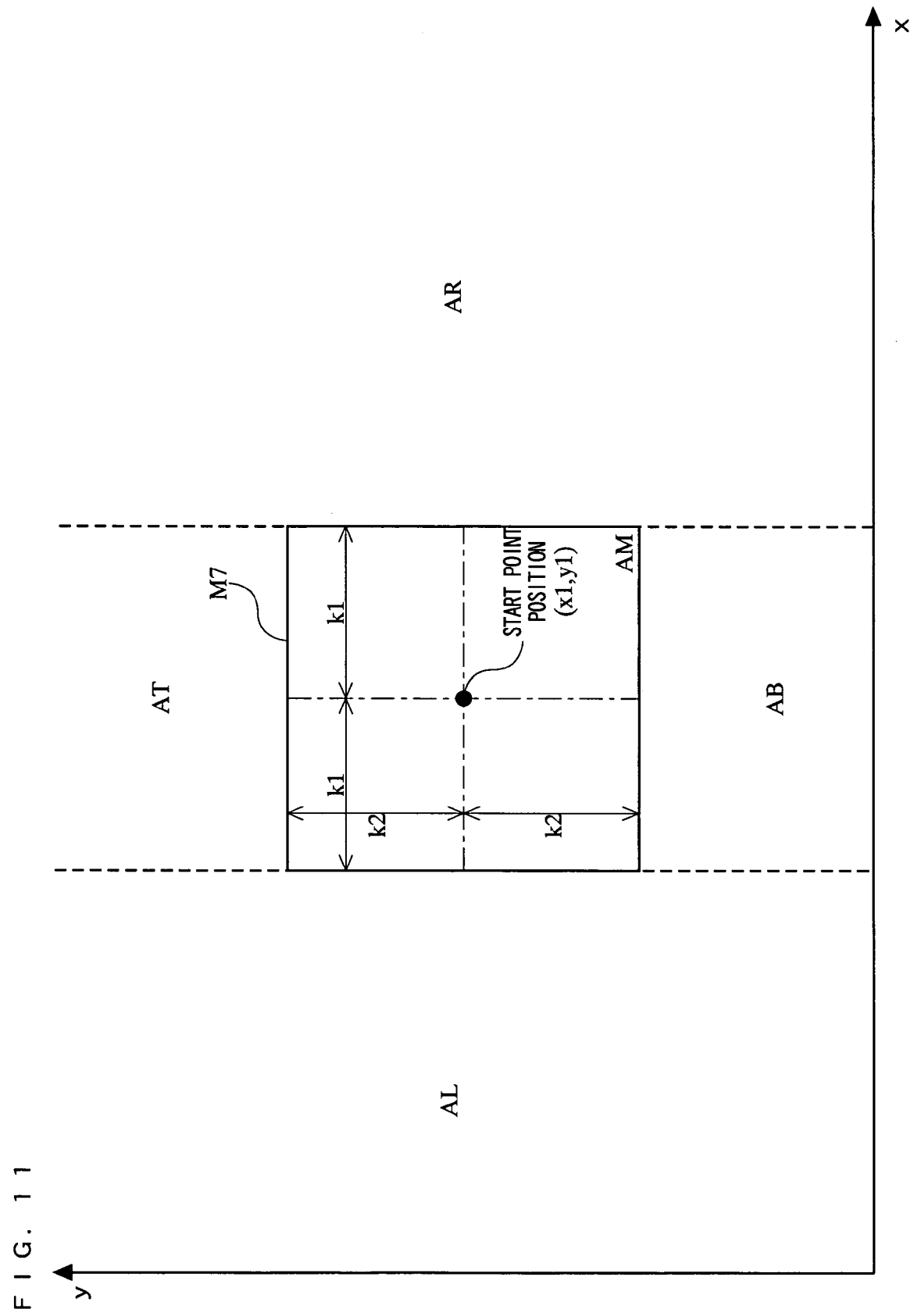
FIG. 11 shows various areas defined when the stylus touches the touch panel 15 at a point on the background image displayed on the second LCD 12.
Figure 12:
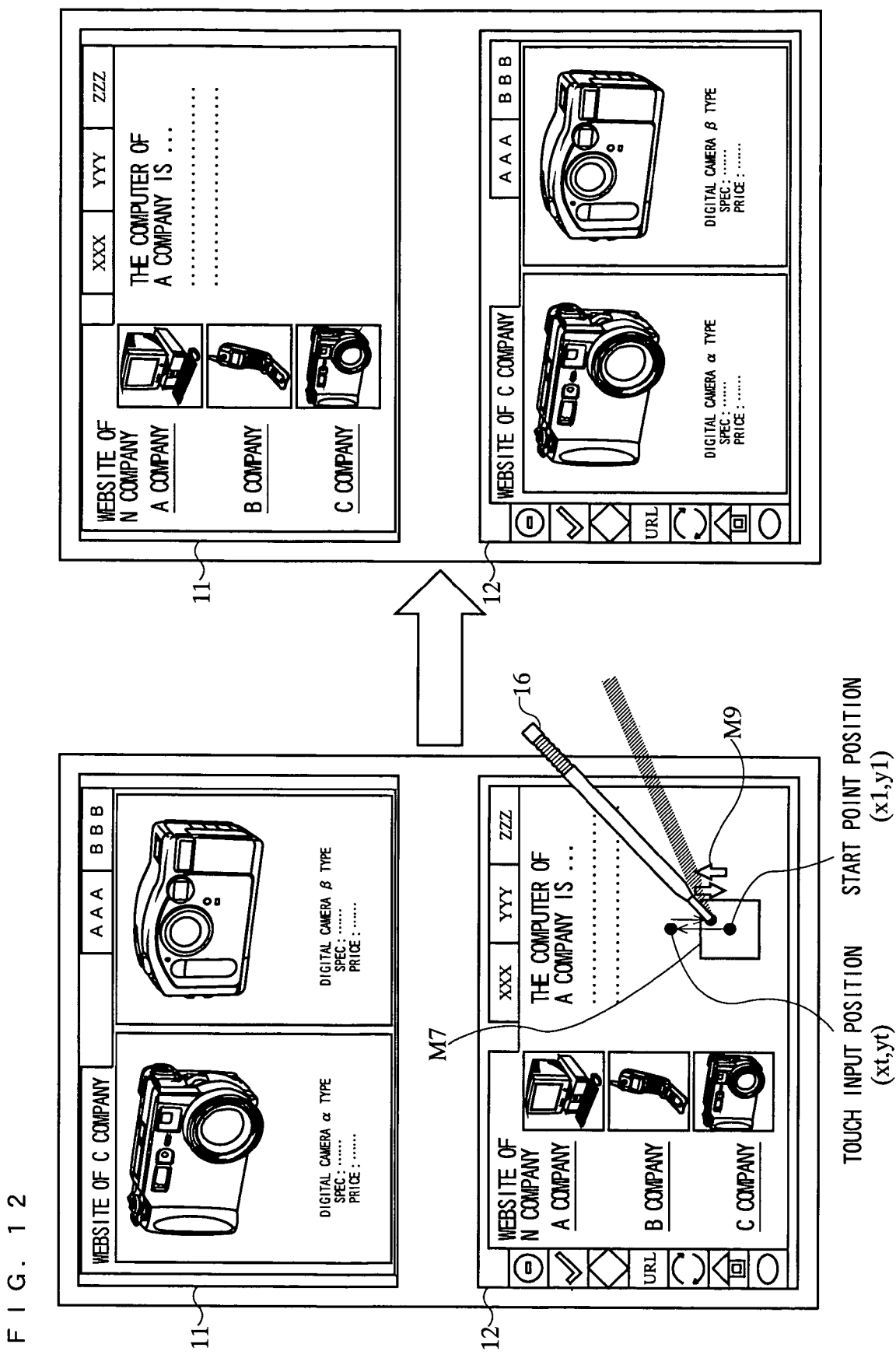
FIG. 12 shows exemplary screen images displayed on the first LCD 11 and the second LCD 12 when the stylus is slid on the touch panel 15 upward from a point on the background image displayed on the second LCD 12 and then back downward.

Referring now to FIGS. 3 to 12, examples of how images are displayed on the first LCD 11 and the second LCD 12 during the processing operation of the input position processing program executed by the video game device 1 will be described, before describing the processing operation in detail. For the purpose of illustration, the following description will be directed to a case where the wireless communications section 33 is connected to a network such as the Internet, and information content such as text and graphics that are laid open to the public on the network is viewed on the first LCD 11 and the second LCD 12. FIG. 3 shows exemplary screen images initially displayed on the first LCD 11 and the second LCD 12. FIG. 4 shows exemplary screen images displayed on the first LCD 11 and the second LCD 12 when the touch panel 15 is tapped on a link displayed on the second LCD 12. FIG. 5 shows exemplary screen images displayed on the first LCD 11 and the second LCD 12 when the stylus is slid on the touch panel 15 upward from a link displayed on the second LCD 12. FIG. 6 shows exemplary screen images displayed on the first LCD 11 and the second LCD 12 when the stylus is slid on the touch panel 15 upward from a link displayed on the second LCD 12 and then back downward. FIG. 7 shows exemplary screen images displayed on the first LCD 11 and the second LCD 12 when the stylus is slid on the touch panel 15 downward from a tab displayed on the second LCD 12. FIG. 8 shows exemplary screen images displayed on the first LCD 11 and the second LCD 12 when the stylus is slid on the touch panel 15 downward from a tab displayed on the second LCD 12 and then back upward. FIG. 9 shows exemplary screen images displayed on the first LCD 11 and the second LCD 12 when the stylus is slid on the touch panel 15 so as to substantially encircle a portion of the information content displayed on the second LCD 12. FIG. 10 shows exemplary screen images displayed on the first LCD 11 and the second LCD 12 when the stylus is slid on the touch panel 15 upward from a point on the background image displayed on the second LCD 12. FIG. 11 shows various areas defined when the stylus touches the touch panel 15 at a point on the background image displayed on the second LCD 12. FIG. 12 shows exemplary screen images displayed on the first LCD 11 and the second LCD 12 when the stylus is slid on the touch panel 15 upward from a point on the background image displayed on the second LCD 12 and then back downward.

Referring to FIG. 3, in a case where information content such as text and graphics that are laid open to the public on the network is viewed on the video game device 1 via the wireless communications section 33, currently-selected information content is initially displayed only on the second LCD 12, for example. For example, the content of a webpage selected by the user is displayed on the second LCD 12. In the example of FIG. 3, active areas within the webpage content include text links and image links to pages of other websites, and tabs that are links to other pages within the current website. Moreover, various icons are arranged along the left edge of the display screen of the second LCD 12, each icon being assigned a webpage browsing function of the video game device 1. One of these icons is an encirclement mode icon.

Referring to FIG. 4, when the user touches, with the stylus 16, the touch panel 15 on a link displayed on the second LCD 12 (an image link in FIG. 4), a circle M1 centered about the touched point is displayed (as shown in the left half of FIG. 4). Then, when the user lifts the stylus 16 off the touch panel 15, the destination webpage content (response image) specified by the touched link is displayed on the second LCD 12 (as shown in the right half of FIG. 4). While the webpage content displayed on the second LCD 12 is replaced with the destination webpage content, the display on the first LCD 11 remains unchanged. Such an operation of touching the touch panel 15 and immediately lifting the stylus 16 off the touch panel 15 will be hereinafter referred to as "tapping".

Referring to FIG. 5, when the user touches, with the stylus 16, the touch panel 15 on a link displayed on the second LCD 12 (a text link in FIG. 5) and slides the stylus 16 on the touch panel 15 upward without lifting the stylus 16 off the touch panel 15, an upward arrow M2 is displayed near the currently touched point (as shown in the left half of FIG. 5). Such an operation of touching the touch panel 15 with the stylus 16 and sliding the stylus 16 on the touch panel 15 without lifting the stylus 16 off the touch panel 15 will be hereinafter referred to as a "slide operation". Specifically, the position on the screen corresponding to the touch input position at which the user first touches the touch panel 15 is defined as the start point position (x1,y1), and a reference line $y=y1+c1$ is defined in the same display screen coordinate system. Herein, c1 is a predetermined constant. Then, when the stylus 16 is slid on the touch panel 15 upward above the reference line (the touch input position (xt,yt) in FIG. 5), the upward arrow M2 is displayed.

If the user, after sliding the stylus 16 as described above, lifts the stylus 16 off the touch panel 15 at a position above the reference line, the destination webpage content for the initially touched link (i.e., a link corresponding to the start point position (x1,y1)) is displayed on the first LCD 11. In this case, the display of the second LCD 12 remains unchanged, and the second LCD 12 continues to display the same webpage content (as shown in the right half of FIG. 5). Thus, while keeping the displayed content on the second LCD 12, the information content specified by the first touch with the stylus 16 (response image) is displayed on a display section (the first LCD 11) that corresponds to the direction of the user's slide operation (i.e., the upward direction from the second LCD 12 toward the first LCD 11).

Referring to FIG. 6, when the user touches, with the stylus 16, the touch panel 15 on a link displayed on the second LCD 12 (a text link in FIG. 6) and slides the stylus on the touch panel 15 upward and then back downward without lifting the stylus 16 off the touch panel 15, an upward/downward arrow M3 is displayed near the currently touched point (as shown in the left half of FIG. 6). Specifically, the start point position (x1,y1) and the reference line $y=y1+c1$ are defined, as in the case of FIG. 5. Then, when the stylus 16 is slid on the touch panel 15 upward above the reference line and then back downward below the reference line (e.g., to the touch input position (xt,yt) in FIG. 6), the upward/downward arrow M3 is displayed.

Then, when the user lifts the stylus 16 off the touch panel 15 at a position below the reference line after sliding the stylus 16 up and down as described above, the destination webpage content (response image) for the initially touched link (i.e., a link corresponding to the start point position (x1,y1)) is displayed on the second LCD 12. The webpage content, which has been displayed on the second LCD 12, is then moved to the first LCD 11 (as shown in the right half of FIG. 6). Thus, the information content specified by the first touch is displayed on the second LCD 12 while the displayed content on the second LCD 12 is moved to the first LCD 11, thereby switching around the displayed content on the upper and lower display sections (the first LCD 11 and the second LCD 12) according to the direction of the user's slide operation (i.e., according to the reciprocal upward and downward movement along the direction in which the first LCD 11 and the second LCD 12 are arranged with respect to each other).

Referring to FIG. 7, when the user touches, with the stylus 16, the touch panel 15 on a tab displayed on the second LCD 12 (the tab "xxx" in FIG. 7), information content of another page within the current website (response image) corresponding to the tab (i.e., the tab "xxx" corresponding to the start point position (x1,y1)) is immediately displayed on the first LCD 11. Then, when the user slides the stylus 16 on the touch panel 15 downward without lifting the stylus 16 off the touch panel 15, a downward arrow M4 is displayed near the currently touched point (as shown in the left half of FIG. 7). Specifically, the position on the screen corresponding to the touch input position at which the user first touches the touch panel 15 is defined as the start point position (x1,y1), and a reference line $y=y1-c2$ is defined in the same display screen coordinate system. Herein, c2 is a predetermined constant. Then, when the stylus 16 is slid on the touch panel 15 downward below the reference line (the touch input position (xt,yt) in FIG. 7), the downward arrow M4 is displayed.

If the user, after sliding the stylus 16 as described above, lifts the stylus 16 off the touch panel 15 at a position below the reference line, the information content corresponding to the touched tab, which has been displayed on the first LCD 11, is displayed on the second LCD 12 (as shown in the right half of FIG. 7). Note that while the webpage content displayed on the second LCD 12 is switched to the information content corresponding to the touched tab, the first LCD 11 continues to display the information content corresponding to the tab. Thus, while keeping the displayed content on the first LCD 11, the information content specified by the first touch with the stylus 16 (response image) is displayed on a display section (the second LCD 12) that corresponds to the direction of the user's slide operation (i.e., the downward direction from the first LCD 11 toward the second LCD 12). Note that while the information content specified by the first touch with the stylus 16 (response image) is displayed on both the first LCD 11 and the second LCD 12 in the right half of FIG. 7, the previous information content, which was displayed on the first LCD 11 before the first touch, may be displayed again on the first LCD 11.

Referring to FIG. 8, when the user touches, with the stylus 16, the touch panel 15 on a tab displayed on the second LCD 12 (the tab "xxx" in FIG. 8), information content of another page within the current website (response image) corresponding to the tab (i.e., the tab "xxx" corresponding to the start point position (x1,y1)) is immediately displayed on the first LCD 11. Then, when the user slides the stylus 16 on the touch panel 15 downward and then back upward without lifting the stylus 16 off the touch panel 15, an upward/downward arrow M5 is displayed near the currently touched point (as shown in the left half of FIG. 8). Specifically, the start point position (x1,y1) and the reference line $y=y1-c2$ are defined, as in the case of FIG. 7. Then, when the stylus 16 is slid on the touch panel 15 downward below the reference line and then back upward above the reference line (e.g., to the touch input position (xt,yt) in FIG. 8), the upward/downward arrow M5 is displayed.

Then, when the user lifts the stylus 16 off the touch panel 15 at a position above the reference line after sliding the stylus 16 down and up as described above, the information content corresponding to the touched tab is displayed on the second LCD 12. The webpage content, which has been displayed on the second LCD 12, is then moved to the first LCD 11 (as shown in the right half of FIG. 8). Thus, the information content specified by the first touch is displayed on the second LCD 12 while the displayed content on the second LCD 12 is moved to the first LCD 11, thereby switching around the displayed content on the upper and lower display sections (the first LCD 11 and the second LCD 12) according to the direction of the user's slide operation (i.e., according to the reciprocal downward and upward movement along the direction in which the second LCD 12 and the first LCD 11 are arranged with respect to each other).

Referring to FIG. 9, when the user taps an encirclement mode icon Ia, the video game device 1 transitions to an encirclement mode. In the encirclement mode, when the user draws a line with the stylus 16 on the touch panel 15 around a portion of the information content displayed on the second LCD 12 (a block of text on the background image in FIG. 9), a trace M6 left by the stylus 16 on the touch panel 15 is displayed (as shown in the left half of FIG. 9). Specifically, the position on the screen corresponding to the touch input position at which the user first touches the touch panel 15 is defined as the start point position (x1,y1), and a start area is defined in the same display screen coordinate system centered about the start point position (x1,y1). Then, when the user drawing a circle with the stylus 16 on the touch panel 15 moves the stylus 16 back into the start area (e.g., to the touch input position (xt,yt) in FIG. 9), the trace M6 is displayed. Then, when the user lifts the stylus 16 off the touch panel 15 while the stylus 16 is within the start area, the image of a part of information content that is encircled by the trace M6 is displayed on the first LCD 11 on an enlarged scale. The display of the second LCD 12 remains unchanged, and the second LCD 12 continues to display the same webpage content (as shown in the right half of FIG. 9). Thus, while keeping the displayed content on the second LCD 12, the image of a part of information content that is encircled by the trace drawn by the user is displayed on the other display section (the first LCD 11).

Referring to FIG. 10, when the user touches, with the stylus 16, the touch panel 15 at a point on the background image displayed on the second LCD 12 and slides the stylus 16 upward without lifting the stylus 16 off the touch panel 15, a guide image M7 is displayed near the start point position and an upward arrow M8 is displayed near the currently touched point (as shown in the left half of FIG. 10).

Specifically, referring to FIG. 11, the position on the screen corresponding to the touch input position at which the user first touches the touch panel 15 is defined as the start point position (x1,y1), and a plurality of areas are defined with respect to the start point position (x1,y1) in the same display screen coordinate system. A reference area AM is defined centered about the start point position (x1,y1). In the display screen coordinate system (x,y), the reference area AM is an area within which $x1-k1 \leq x \leq x1+k1$ and $y1-k2 \leq y \leq y1+k2$ both hold true. Herein, k1 and k2 are each a predetermined constant. The guide image M7 is displayed to visually indicate the boundary of the reference area AM.

An upper area AT is defined on top of the reference area AM. In the display screen coordinate system (x,y), the upper area AT is an area within which $x1-k1 \leq x \leq x1+k1$ and $y=y1+k2$ both hold true. A lower area AB is defined beneath the reference area AM. In the display screen coordinate system (x,y), the lower area AB is an area within which $x1-k1 \leq x \leq x1+k1$ and $y=y1-k2$ both hold true. A left area AL is defined on the left of the reference area AM. In the display screen coordinate system (x,y), the left area AL is an area within which $x<x1-k1$ holds true. A right area AR is defined on the right of the reference area AM. In the display screen coordinate system (x,y), the right area AR is an area within which $x>x1+k1$ holds true. When the user slides the stylus 16 on the touch panel 15 upward to a point that is in the upper area AT and above the reference area AM (i.e., the area delimited by the guide image M7) as shown in FIG. 10 (e.g., to the touch input position (xt,yt) in FIG. 10), the upward arrow M8 is displayed.

If the user, after sliding the stylus 16 as described above, lifts the stylus 16 off the touch panel 15 at a position within the upper area AT, the webpage content being currently viewed on the second LCD 12 (i.e., the webpage content specified by the start point position (x1,y1)) is displayed on the first LCD 11. In this case, the display of the second LCD 12 remains unchanged, and the second LCD 12 continues to display the same webpage content (as shown in the right half of FIG. 10). Thus, while keeping the displayed content on the second LCD 12, the information content displayed at a position corresponding to the start point of the user's slide operation in the upward direction from the second LCD 12 toward the first LCD 11 (i.e., the information content displayed on the second LCD 12 that is specified by the first touch) is displayed on a display section (the first LCD 11) that corresponds to the direction of the slide operation.

Referring to FIG. 12, when the user touches, with the stylus 16, the touch panel 15 at a point on the background image displayed on the second LCD 12 and slides the stylus 16 upward into the upper area AT and then back downward into the reference area AM (e.g., to the touch input position (xt,yt) in FIG. 12) without lifting the stylus 16 off the touch panel 15, the guide image M7 is displayed near the start point position and an upward/downward arrow M9 is displayed near the currently touched point (as shown in the left half of FIG. 12). Then, various areas are defined as described above with reference to FIG. 11.

Then, when the user lifts the stylus 16 off the touch panel 15 at a position within the reference area AM after sliding the stylus 16 up and down as described above, the webpage content being currently viewed on the second LCD 12 (i.e., the webpage content specified by the start point position (x1,y1)) is displayed on the first LCD 11. The webpage content, which has been displayed on the first LCD 11, is then moved to the second LCD 12 (as shown in the right half of FIG. 12). Thus, the displayed content on the second LCD 12 is moved to the first LCD 11 while the displayed content on the first LCD 11 is moved to the second LCD 12, thereby switching around the displayed content on the upper and lower display sections (the first LCD 11 and the second LCD 12) according to the direction of the user's slide operation (i.e., according to the reciprocal upward and downward movement along the direction in which the first LCD 11 and the second LCD 12 are arranged with respect to each other).

Figure 13:
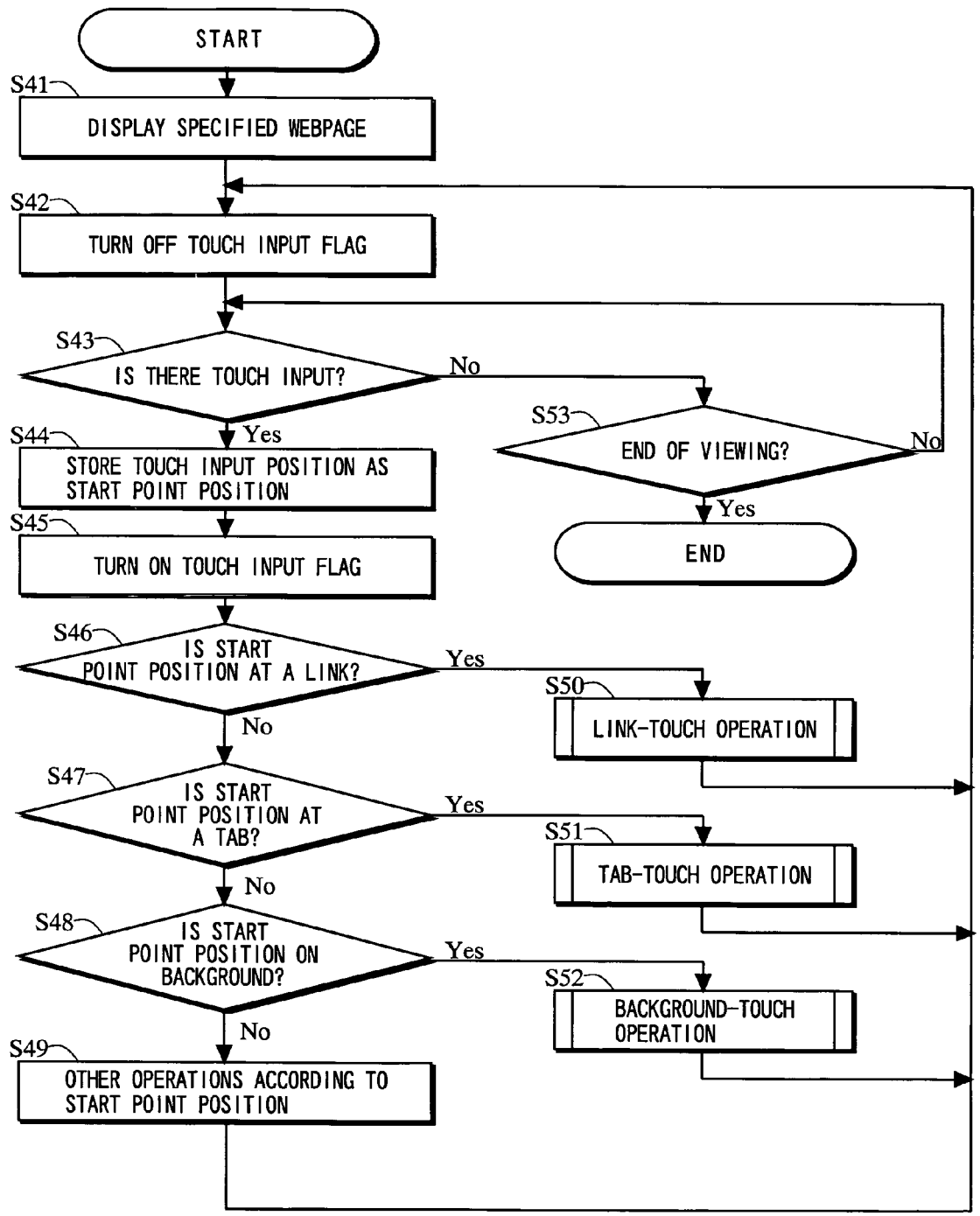
FIG. 13 is a flow chart showing how the video game device 1 performs an input position processing operation by executing an input position processing program.
Figure 14:
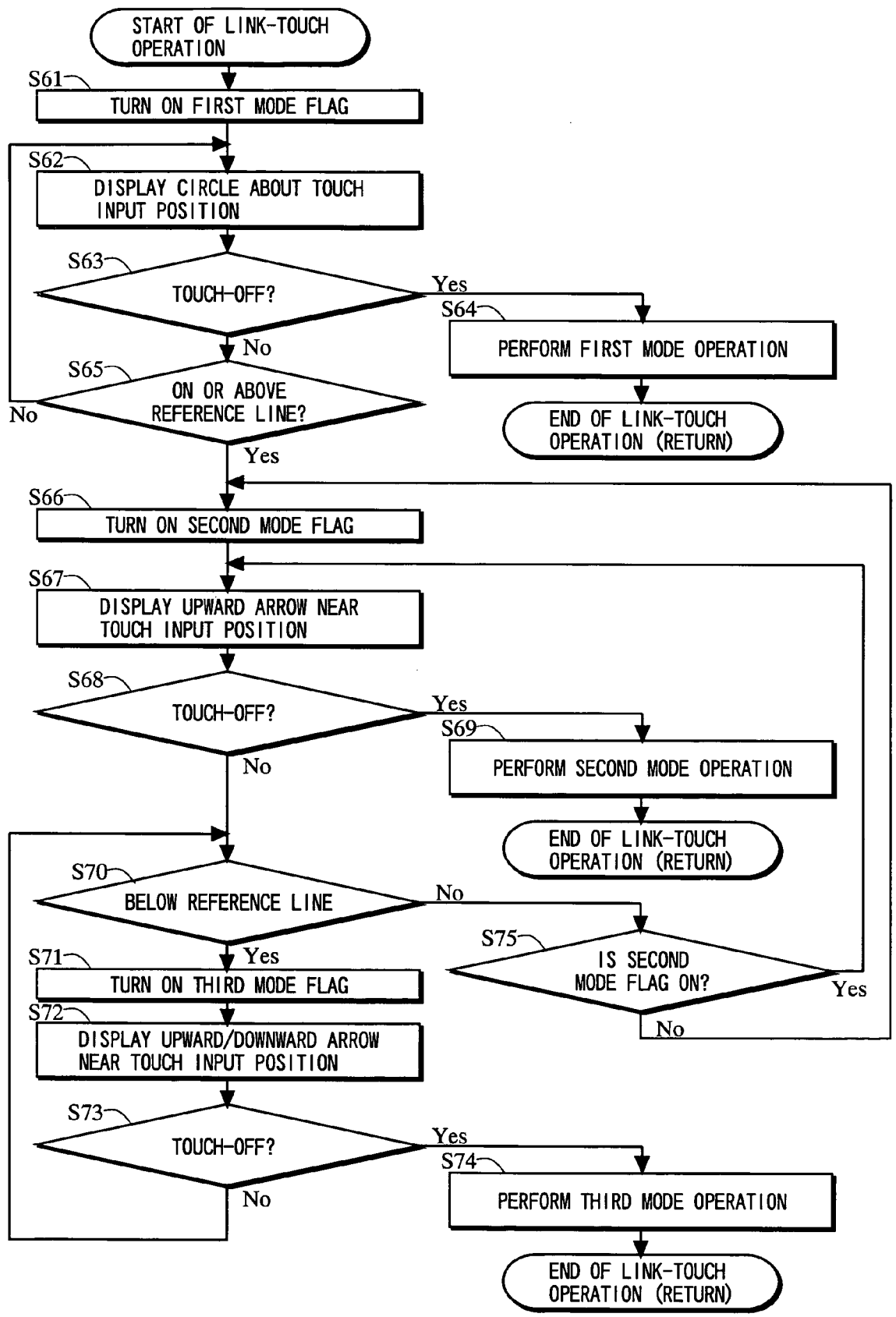
FIG. 14 shows a link-touch operation subroutine in step 50 of FIG. 13.
Figure 15:
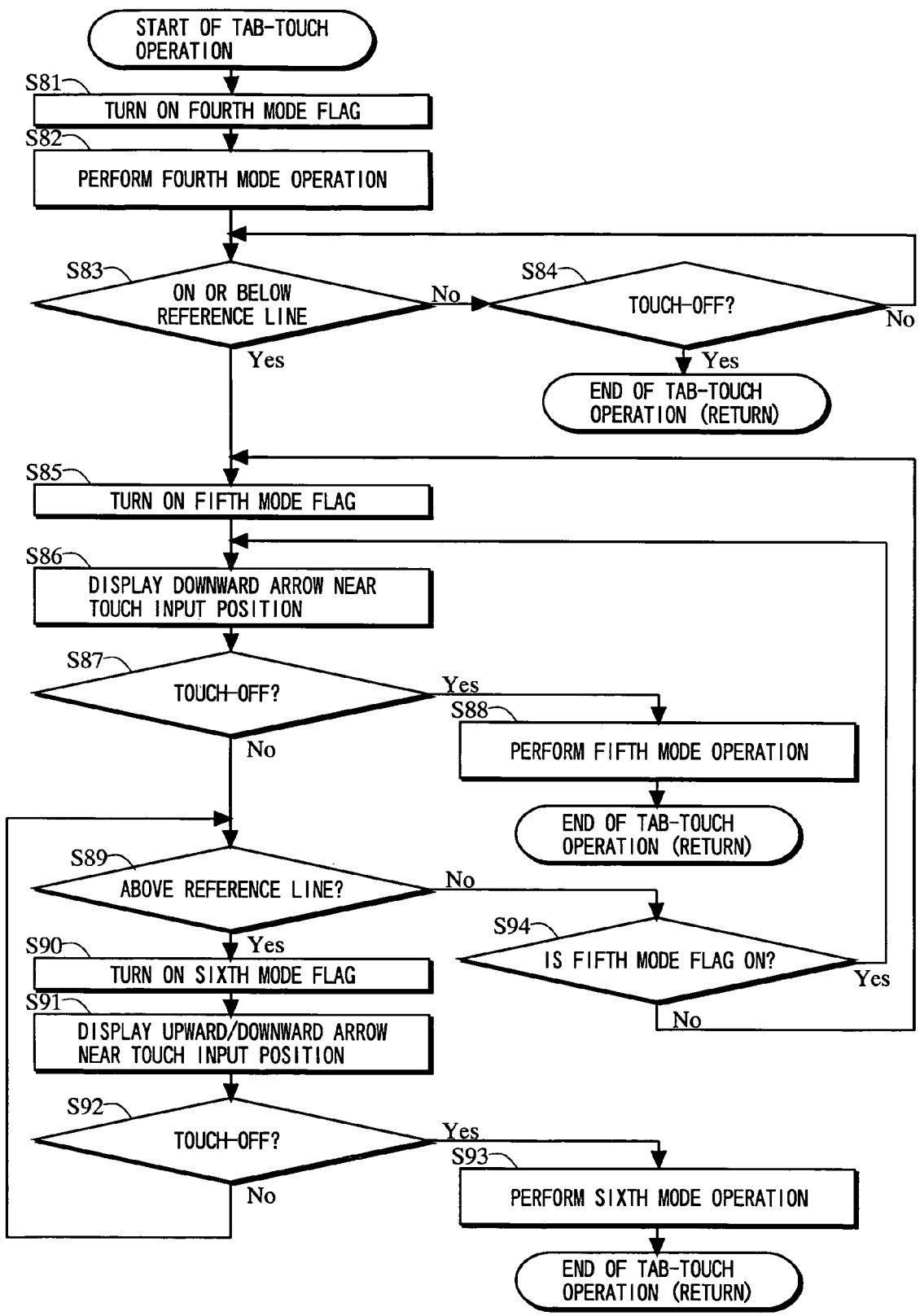
FIG. 15 shows a tab-touch operation subroutine in step 51 of FIG. 13.
Figure 16:
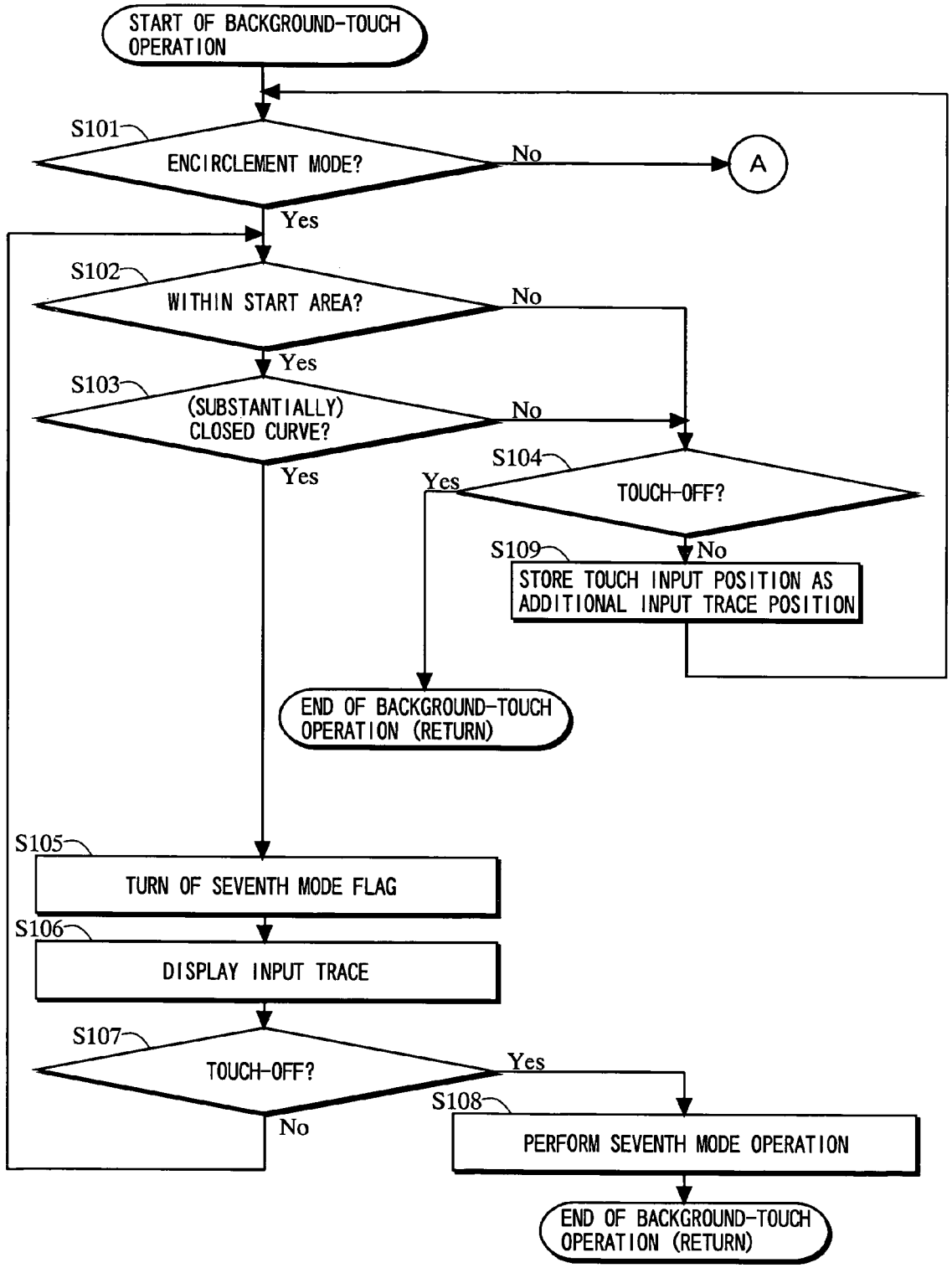
FIG. 16 shows a background-touch operation subroutine in step 52 of FIG. 13.
Figure 17:
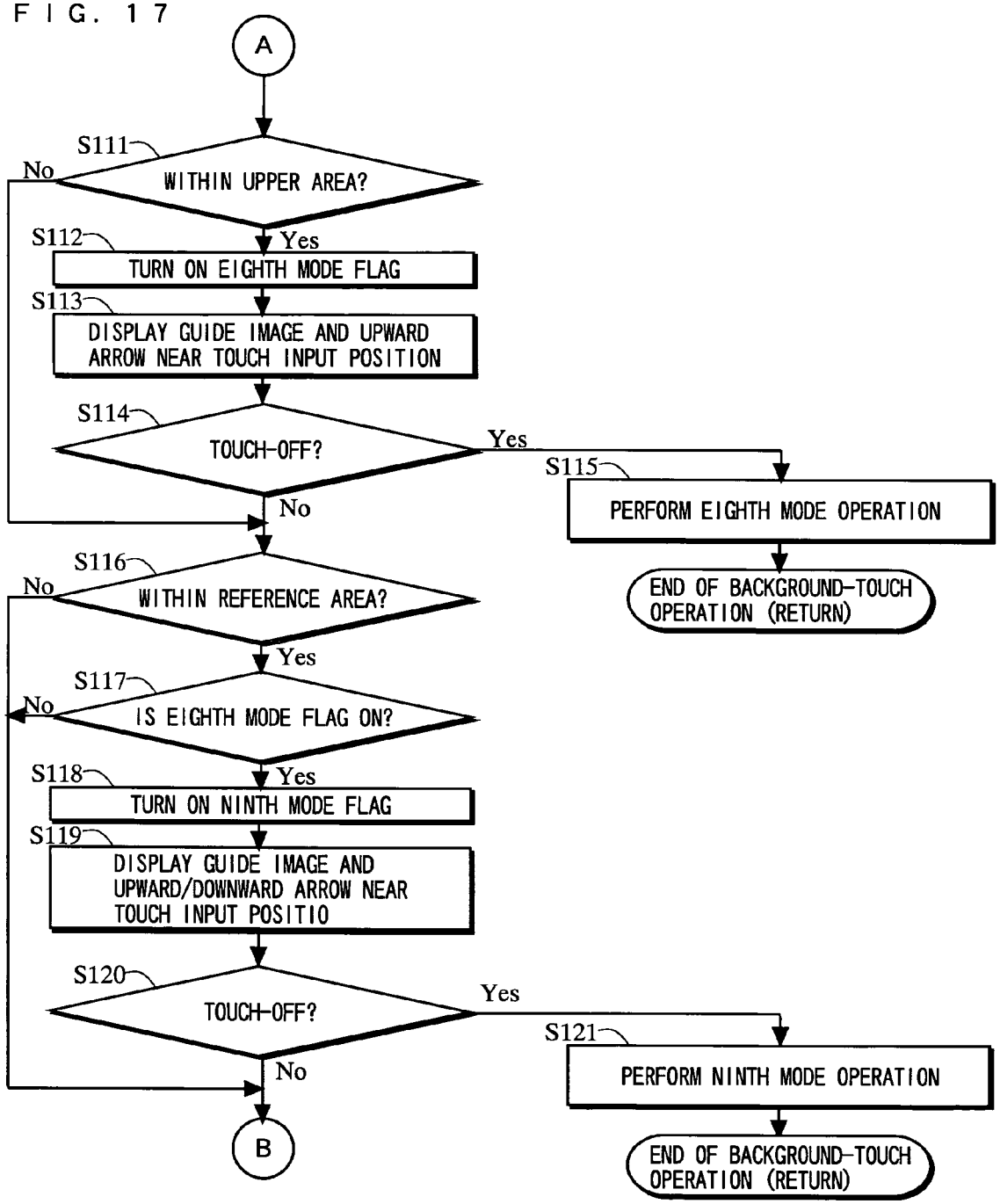
FIG. 17 shows a background-touch operation subroutine in step 52 of FIG. 13.
Figure 18:
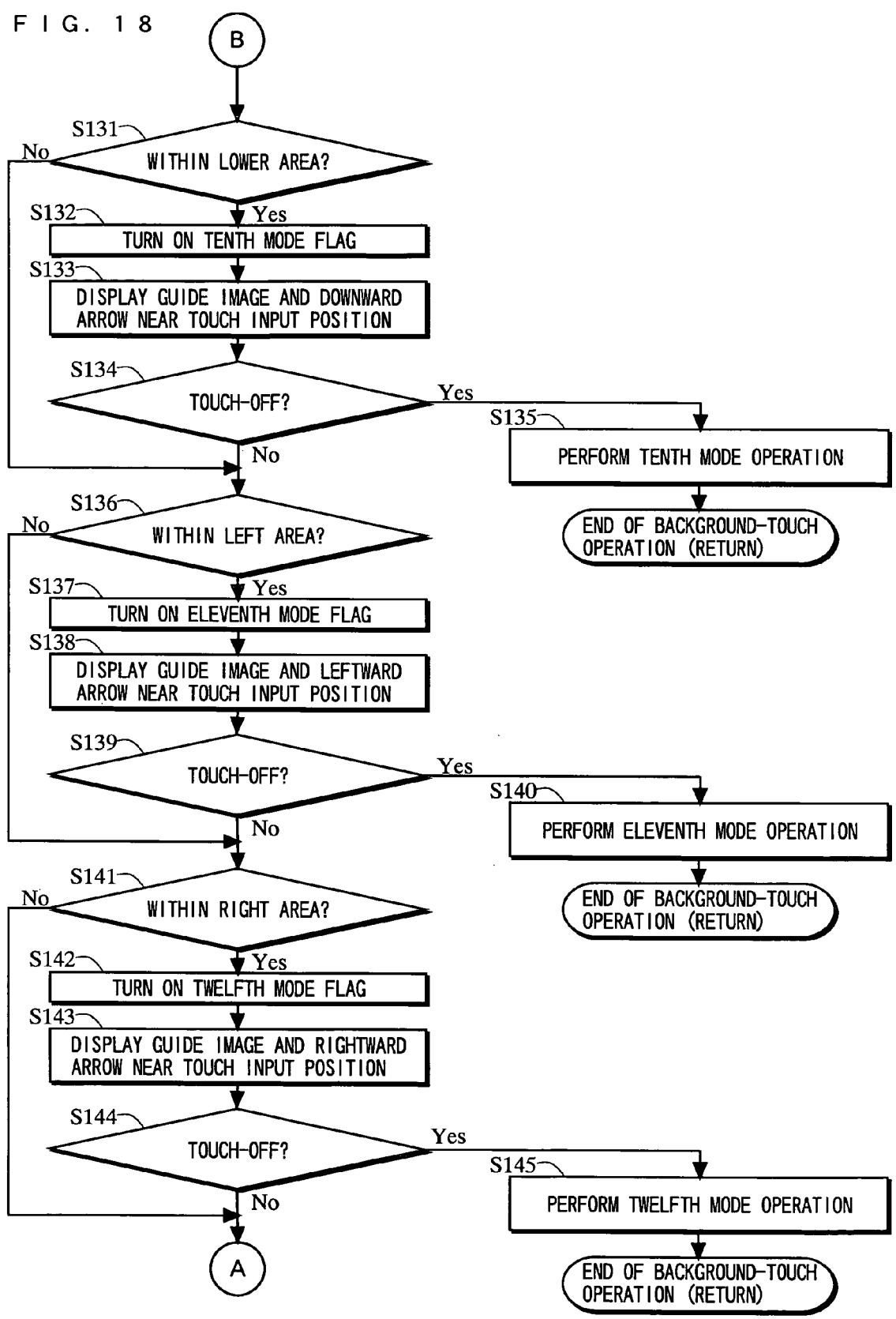
FIG. 18 shows a background-touch operation subroutine in step 52 of FIG. 13.
Figure 19:
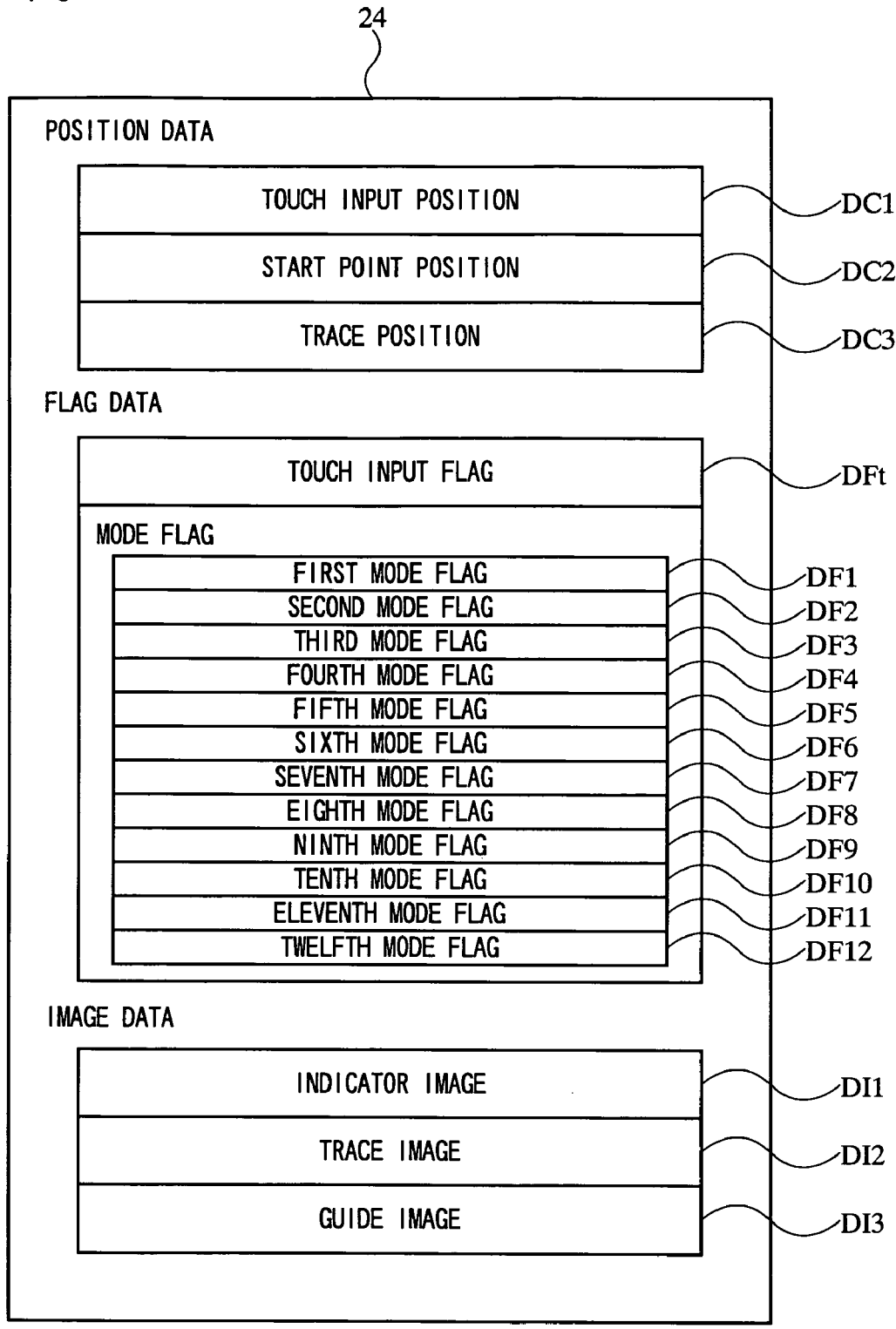
FIG. 19 shows different pieces of data that are stored in a RAM 24 during the processing operation of FIG. 13.

Referring now to FIGS. 13 to 19, specific processing operations of the input position processing program executed by the video game device 1 will be described. FIG. 13 is a flow chart showing how the video game device 1 performs an input position processing operation by executing the input position processing program. FIG. 14 shows a link-touch operation subroutine in step 50 of FIG. 13. FIG. 15 shows a tab-touch operation subroutine in step 51 of FIG. 13. FIGS. 16 to 18 show a background-touch operation subroutine in step 52 of FIG. 13. FIG. 19 shows different pieces of data that are stored in the RAM 24 during the processing operation of FIG. 13. Programs for performing these operations are included in the input position processing program stored in the ROM 17a. When the power supply of the video game device 1 is turned ON, these programs are loaded from the ROM 17a to the RAM 24 and executed by the CPU core 21. For the purpose of illustration, the following description will be directed to a case where the wireless communications section 33 is connected to a network such as the Internet, and information content such as text and graphics that are laid open to the public on the network is viewed on the first LCD 11 and the second LCD 12.

First, when the power supply (not shown) of the video game device 1 is turned ON, a boot program (not shown) is executed by the CPU core 21, whereby the input position processing program stored in the memory card 17 is loaded to the RAM 24. The loaded input position processing program is executed by the CPU core 21, thereby performing steps shown in FIG. 13 (an abbreviation "S" is used for "step" in FIGS. 13 to 18).

Referring to FIG. 13, information content such as text and graphics that are laid open to the public on a webpage specified by a user operation is displayed by the CPU core 21 at least on the second LCD 12 (step 41; see FIG. 3). Then, the CPU core 21 turns OFF a touch input flag DFt stored in the RAM 24 (step 42), and the process proceeds to the following step. In step 42, the CPU core 21 turns OFF all of first to twelfth mode flags DF1 to DF12 stored in the RAM 24.

Each position data (a set of coordinates) inputted from the touch panel 15 is converted, at appropriate timing, into a position (a set of coordinates) on the image displayed on the second LCD 12 corresponding to the contact point at which the touch panel 15 is being touched and is stored in the RAM 24 as a touch input position DC1, as shown in FIG. 19. The RAM 24 also stores other kinds of position data DC for producing images, such as a start point position DC2 and trace positions DC3. The RAM 24 also stores, in addition to the touch input flag DFt, other kinds of flag data DF based on which an operation to be performed next (hereinafter referred to as the "next operation") is determined, including the first to twelfth mode flags DF1 to DF12. The RAM 24 also stores image data DI for producing an image representing a recognized operation gesture, including an indicator image DI1, a trace image DI2 and a guide image DI3.

Referring back to FIG. 13, the CPU core 21 determines whether or not there is a touch input from the touch panel 15 being made by a user operation (step 43). If so, the process proceeds to step 44. Otherwise, it is determined whether or not the viewing of the information content currently being displayed should be terminated (step 53). The CPU core 21 returns to step 43 to repeat the loop if the viewing should be continued, and exits the process of the flow chart if the viewing should be terminated.

In step 44, the CPU core 21 stores the position on the image displayed on the second LCD 12 corresponding to the contact point on the touch panel 15 currently being touched (i.e., the current touch input position DC1) in the RAM 24 as the start point position DC2. Then, the CPU core 21 turns ON the touch input flag DFt stored in the RAM 24 (step 45), and the process proceeds to the following step.

Then, the CPU core 21 determines whether or not the image at the start point position DC2 is a link (step 46), whether or not it is a tab (step 47), and whether or not it is a background image (step 48). If the image at the start point position DC2 is a link such as an image link or a text link ("Yes" in step 46), the CPU core 21 performs the link-touch operation (step 50), and then returns to step 42 to repeat the loop. If the image at the start point position DC2 is a tab ("Yes" in step 47), the CPU core 21 performs the tab-touch operation (step 51), and then returns to step 42 to repeat the loop. If the image at the start point position DC2 is a background image ("Yes" in step 48), the CPU core 21 performs the background-touch operation (step 52), and then returns to step 42 to repeat the loop. If the image at the start point position DC2 is none of a link, a tab and the background image ("No" in steps 46 to 48), the CPU core 21 performs an appropriate operation according to the start point position DC2 (step 49), and then returns to step 42 to repeat the loop. The link-touch operation, the tab-touch operation and the background-touch operation will now be described in detail.

Referring to FIG. 14, the link-touch operation in step 50 is performed as follows. First, the CPU core 21 turns ON the first mode flag DF1 stored in the RAM 24 (step 61). Then, the CPU core 21 displays the circle M1 centered about the current touch input position DC1 over the information content displayed on the second LCD 12 by using the indicator image DI1 (step 62; see FIG. 4), and determines whether or not the user has lifted the stylus 16 off the touch panel 15 (this will be referred to also as "touch-off") (step 63). The CPU core 21 proceeds to step 64 if the user has lifted the stylus 16, and to step 65 if the user is still touching the touch panel 15.

In step 64, the CPU core 21 performs the first mode operation based on the first mode flag DF1 currently being ON, and exits the subroutine. The first mode operation is an operation as shown in FIG. 4, i.e., an operation of displaying the destination webpage content for a tapped link on the second LCD 12 while keeping the displayed content on the first LCD 11.

In step 65, the CPU core 21 determines whether or not the current touch input position DC1 is on or above the reference line. If so, the CPU core 21 proceeds to step 66. Otherwise, the CPU core 21 returns to step 62 to repeat the loop. The CPU core 21 defines, as the reference line used in step 65, a line that satisfies $y=y_1+c_1$ (where $c_1$ is a constant) with respect to the start point position DC2 $(x_1,y_1)$. Thus, if the current touch input position DC1 $(x_t,y_t)$ satisfies $y_t=y_1+c_1$, the CPU core 21 determines that the current touch input position DC1 is on or above the reference line.

In step 66, the CPU core 21 turns ON the second mode flag DF2 stored in the RAM 24, and turns OFF the first mode flag DF1 and the third mode flag DF3. Then, the CPU core 21 displays the upward arrow M2 near the current touch input position DC1 over the information content displayed on the second LCD 12 by using the indicator image DI1 (step 67; see FIG. 5), and determines whether or not the user has lifted the stylus 16 (step 68). The CPU core 21 proceeds to step 69 if the user has lifted the stylus 16, and to step 70 if the user is still touching the touch panel 15.

In step 69, the CPU core 21 performs the second mode operation based on the second mode flag DF2 currently being ON, and exits the subroutine. The second mode operation is an operation as shown in FIG. 5, i.e., an operation of displaying the destination webpage content for the touched link on the first LCD 11 while keeping the displayed content on the second LCD 12.

In step 70, the CPU core 21 determines whether or not the current touch input position DC1 is below the reference line used in step 65. The CPU core 21 proceeds to step 71 if the touch input position DC1 is below the reference line. In a case where the touch input position DC1 is on or above the reference line, the CPU core 21 returns to step 67 to repeat the loop if the second mode flag DF2 is ON, and returns to step 66 to repeat the loop if the second mode flag DF2 is OFF (step 75).

In step 71, the CPU core 21 turns ON the third mode flag DF3 stored in the RAM 24, and turns OFF the second mode flag DF2. Then, the CPU core 21 displays the upward/downward arrow M3 near the current touch input position DC1 over the information content displayed on the second LCD 12 by using the indicator image DI1 (step 72; see FIG. 6), and determines whether or not the user has lifted the stylus 16 (step 73). The CPU core 21 proceeds to step 74 if the user has lifted the stylus 16, and returns to step 70 to repeat the loop if the user is still touching the touch panel 15.

In step 74, the CPU core 21 performs the third mode operation based on the third mode flag DF3 currently being ON, and exits the subroutine. The third mode operation is an operation as shown in FIG. 6, i.e., an operation of displaying the destination webpage content for the touched link on the second LCD 12 while moving the displayed content on the second LCD 12 to the first LCD 11.

If the user slides the stylus 16 to a point on or above the reference line after the third mode flag DF3 is turned ON in step 71 (i.e., "No" in step 70), the process proceeds to step 66. Then, the third mode flag DF3 is turned OFF and the second mode flag DF2 is turned back ON. This cancels the gesture of the downward slide operation on the touch panel 15 from a point on or above the reference line to a point below the reference line, whereby only the upward slide operation from the start point position DC2 to the current point on or above the reference line is recognized as a valid operation gesture.

Referring to FIG. 15, the tab-touch operation in step 51 is performed as follows. First, the CPU core 21 turns ON the fourth mode flag DF4 stored in the RAM 24 (step 81). Then, the CPU core 21 performs the fourth mode operation based on the fourth mode flag DF4 currently being ON (step 82), and the process proceeds to the following step. The fourth mode operation is an operation of immediately displaying information content of another page within the current website corresponding to the touched tab (i.e., the tab corresponding to the start point position DC2) on the first LCD 11 (see, for example, the left half of FIG. 7 or the left half of FIG. 8).

Then, the CPU core 21 determines whether or not the current touch input position DC1 is on or below the reference line (step 83). If so, the CPU core 21 proceeds to step 85. Otherwise, the CPU core 21 determines whether or not the user has lifted the stylus 16 (step 84). The CPU core 21 returns to step 83 to repeat the loop if the user is still touching the touch panel 15, and exits the subroutine if the user has lifted the stylus 16. The CPU core 21 defines, as the reference line used in step 83, a line that satisfies y=y1−c2 (where c2 is a constant) with respect to the start point position DC2 (x1,y1). Thus, if the current touch input position DC1 (xt,yt) satisfies yt=y1−c2, the CPU core 21 determines that the current touch input position DC1 is on or below the reference line.

In step 85, the CPU core 21 turns ON the fifth mode flag DF5 stored in the RAM 24, and turns OFF the fourth mode flag DF4 and the sixth mode flag DF6. Then, the CPU core 21 displays the downward arrow M4 near the current touch input position DC1 over the information content displayed on the second LCD 12 by using the indicator image DI1 (step 86; see FIG. 7), and determines whether or not the user has lifted the stylus 16 (step 87). The CPU core 21 proceeds to step 88 if the user has lifted the stylus 16, and to step 89 if the user is still touching the touch panel 15.

In step 88, the CPU core 21 performs the fifth mode operation based on the fifth mode flag DF5 currently being ON, and exits the subroutine. The fifth mode operation is an operation as shown in FIG. 7, i.e., an operation of displaying the information content of the other page corresponding to the touched tab, which has been displayed on the first LCD 11, on the second LCD 12. In the fifth mode operation as described above, the information content of the other page corresponding to the touched tab is displayed on both the first LCD 11 and the second LCD 12. Alternatively, the information content, which was displayed on the second LCD 12 before the user touched the tab, may be displayed again on the first LCD 11.

In step 89, the CPU core 21 determines whether or not the current touch input position DC1 is above the reference line used in step 83. The CPU core 21 proceeds to step 90 if the touch input position DC1 is above the reference line. In a case where the touch input position DC1 is on or below the reference line, the CPU core 21 returns to step 86 to repeat the loop if the fifth mode flag DF5 is ON, and returns to step 85 to repeat the loop if the fifth mode flag DF5 is OFF (step 94).

In step 90, the CPU core 21 turns ON the sixth mode flag DF6 stored in the RAM 24, and turns OFF the fifth mode flag DF5. Then, the CPU core 21 displays the upward/downward arrow M5 near the current touch input position DC1 over the information content displayed on the second LCD 12 by using the indicator image DI1 (step 91; see FIG. 8), and determines whether or not the user has lifted the stylus 16 (step 92). The CPU core 21 proceeds to step 93 if the user has lifted the stylus 16, and returns to step 89 to repeat the loop if the user is still touching the touch panel 15.

In step 93, the CPU core 21 performs the sixth mode operation based on the sixth mode flag DF6 currently being ON, and exits the subroutine. The sixth mode operation is an operation as shown in FIG. 8, i.e., an operation of displaying the information content of another page within the current website corresponding to the touched tab, which has been displayed on the first LCD 11, on the second LCD 12 while moving the displayed content on the second LCD 12 to the first LCD 11.

If the user slides the stylus 16 to a point on or below the reference line after the sixth mode flag DF6 is turned ON in step 90 (i.e., "No" in step 89), the process proceeds to step 85. Then, the sixth mode flag DF6 is turned OFF and the fifth mode flag DF5 is turned back ON. This cancels the gesture of the upward slide operation on the touch panel 15 from a point on or below the reference line to a point above the reference line, whereby only the downward slide operation from the start point position DC2 to the current point on or below the reference line is recognized as a valid operation gesture.

Referring to FIG. 16, the background-touch operation in step 52 is performed as follows. First, the CPU core 21 determines whether or not the current mode of operation is the encirclement mode (step 101). If not, the CPU core 21 proceeds to step 111 (FIG. 17). If the current mode of operation is the encirclement mode, the CPU core 21 proceeds to step 102. The process enters the encirclement mode when the user taps on the encirclement mode icon Ia, as described above with reference to FIG. 9.

In step 102, the CPU core 21 determines whether or not the current touch input position DC1 is within the start area. Then, the CPU core 21 determines whether or not a group of stored trace positions DC3, when connected together in their chronological order, forms a closed or substantially closed curve (step 103). If the touch input position DC1 is within start area and the group of trace positions DC3 forms a closed or substantially closed curve ("Yes" in step 102 and step 103; see the left half of FIG. 9), the CPU core 21 proceeds to step 105. If the touch input position DC1 is not within the start area or the group of trace positions DC3 does not form a closed or substantially closed curve ("No" in step 102 and/or step 103), the CPU core 21 determines whether or not the user has lifted the stylus 16 (step 104). If the user has lifted the stylus 16, the CPU core 21 exits the subroutine. If the user is still touching the touch panel 15, the CPU core 21 stores the current touch input position DC1 as an additional trace position DC3 in the RAM 24 (step 109), and returns to step 101 to repeat the loop.

In step 105, the CPU core 21 turns ON the seventh mode flag DF7 stored in the RAM 24. Then, the CPU core 21 displays the trace M6 along the trace positions DC3 over the information content displayed on the second LCD 12 by using the trace image DI2 (step 106; see FIG. 9), and determines whether or not the user has lifted the stylus 16 (step 107). Then, the CPU core 21 proceeds to step 108 if the user has lifted the stylus 16, and returns to step 102 to repeat the loop if the user is still touching the touch panel 15.

In step 108, the CPU core 21 performs the seventh mode operation based on the seventh mode flag DF7 currently being ON, and exits the subroutine. Note that after performing the seventh mode operation, the CPU core 21 erases all the trace positions DC3 from the RAM 24. The seventh mode operation is an operation as shown in FIG. 9, i.e., an operation of displaying the image of a part of information content that is encircled by the trace M6 on the first LCD 11 on an enlarged scale, while keeping the displayed content on the second LCD 12.

If it is determined that the current mode of operation is not the encirclement mode ("No" in step 101) during the background-touch operation in step 52, the CPU core 21 proceeds to step 111 shown in FIG. 17. In step 111, the CPU core 21 determines whether or not the current touch input position DC1 is within the upper area AT (see FIG. 11). If so, the CPU core 21 proceeds to step 112. Otherwise, the CPU core 21 proceeds to step 116. The CPU core 21 defines, as the upper area AT used in step 111, an area that satisfies x1−k1=x=x1+k1 and y=y1+k2 (where k1 and k2 are constants) with respect to the start point position DC2 (x1,y1). Thus, if the current touch input position DC1 (xt,yt) satisfies x1−k1=xt=x1+k1 and yt=y1+k2, the CPU core 21 determines that the current touch input position DC1 is within the upper area AT.

In step 112, the CPU core 21 turns ON the eighth mode flag DF8 stored in the RAM 24, and turns OFF the ninth to twelfth mode flags DF9 to DF12. Then, by using the indicator image DI1, the CPU core 21 displays the upward arrow M8 near the current touch input position DC1 and the guide image M7 around the start point position DC2 over the information content displayed on the second LCD 12 (step 113; see FIG. 10), and determines whether or not the user has lifted the stylus 16 (step 114). The CPU core 21 proceeds to step 115 if the user has lifted the stylus 16, and to step 116 if the user is still touching the touch panel 15.

In step 115, the CPU core 21 performs the eighth mode operation based on the eighth mode flag DF8 currently being ON, and exits the subroutine. The eighth mode operation is an operation as shown in FIG. 10, i.e., an operation of moving the displayed content on the second LCD 12 to the first LCD 11 while keeping it on the second LCD 12.

In step 116, the CPU core 21 determines whether or not the current touch input position DC1 is within the reference area AM (see FIG. 11). If the touch input position DC1 is not within the reference area AM, the CPU core 21 proceeds to step 131 (FIG. 18). In a case where the touch input position DC1 is within the reference area AM, the CPU core 21 proceeds to step 118 if the eighth mode flag DF8 is ON, and to step 131 if the eighth mode flag DF8 is OFF (step 117). The CPU core 21 defines, as the reference area AM used in step 116, an area that satisfies x1−k1=x=x1+k1 and y1−k2<y<y1+k2 (where k1 and k2 are constants) with respect to the start point position DC2 (x1,y1). Thus, if the current touch input position DC1 (xt,yt) satisfies x1−k1=xt=x1+k1 and y1−k2<yt<y1+k2, the CPU core 21 determines that the current touch input position DC1 is within the reference area AM.

In step 118, the CPU core 21 turns ON the ninth mode flag DF9 stored in the RAM 24, and turns OFF the eighth mode flag DF8. Then, by using the indicator image DI1, the CPU core 21 displays the upward/downward arrow M9 near the current touch input position DC1 and the guide image M7 around the start point position DC2 over the information content displayed on the second LCD 12 (step 119; see FIG. 12), and determines whether or not the user has lifted the stylus 16 (step 120). The CPU core 21 proceeds to step 121 if the user has lifted the stylus 16, and to step 131 (FIG. 18) if the user is still touching the touch panel 15.

In step 121, the CPU core 21 performs the ninth mode operation based on the ninth mode flag DF9 currently being ON, and exits the subroutine. The ninth mode operation is an operation as shown in FIG. 12, i.e., an operation of switching around the information content displayed on the first LCD 11 with that displayed on the second LCD 12.

In step 131 of FIG. 18, the CPU core 21 determines whether or not the current touch input position DC1 is within the lower area AB (see FIG. 11). If the touch input position DC1 is not within the lower area AB, the CPU core 21 proceeds to step 136. If the touch input position DC1 is within the lower area AB, the CPU core 21 proceeds to step 132. The CPU core 21 defines, as the lower area AB used in step 131, an area that satisfies x1−k1=x=x1+k1 and y=y1−k2 (where k1 and k2 are constants) with respect to the start point position DC2 (x1,y1). Thus, if the current touch input position DC1 (xt,yt) satisfies x1−k1=xt=x1+k1 and yt=y1−k2, the CPU core 21 determines that the current touch input position DC1 is within the lower area AB.

In step 132, the CPU core 21 turns ON the tenth mode flag DF10 stored in the RAM 24, and turns OFF the eighth, ninth, eleventh and twelfth mode flags DF8, DF9, DF11 and DF12. Then, by using the indicator image DI1, the CPU core 21 displays a downward arrow M10 (not shown) near the current touch input position DC1 and the guide image M7 (see FIG. 10) around the start point position DC2 over the information content displayed on the second LCD 12 (step 133), and determines whether or not the user has lifted the stylus 16 (step 134). The CPU core 21 proceeds to step 135 if the user has lifted the stylus 16, and to step 136 if the user is still touching the touch panel 15.

In step 135, the CPU core 21 performs the tenth mode operation based on the tenth mode flag DF10 currently being ON, and exits the subroutine. The tenth mode operation is an operation of moving the displayed content the first LCD 11 to the second LCD 12 while keeping it on the first LCD 11. Thus, in the tenth mode operation, while keeping the displayed content on the first LCD 11, the information content displayed at a position corresponding to the start point of the user's slide operation in the downward direction from the first LCD 11 toward the second LCD 12 (i.e., the information content displayed on the first LCD 11) is displayed on a display section (the second LCD 12) that corresponds to the direction of the slide operation.

In step 136, the CPU core 21 determines whether or not the current touch input position DC1 is within the left area AL (see FIG. 11). If the touch input position DC1 is not within the left area AL, the CPU core 21 proceeds to step 141. If the touch input position DC1 is within the left area AL, the CPU core 21 proceeds to step 137. The CPU core 21 defines, as the left area AL used in step 136, an area that satisfies x<x1−k1 (where k1 is a constant) with respect to the start point position DC2 (x1,y1). Thus, if the current touch input position DC1 (xt,yt) satisfies xt<x1−k1, the CPU core 21 determines that the current touch input position DC1 is within the left area AL.

In step 137, the CPU core 21 turns ON the eleventh mode flag DF11 stored in the RAM 24, and turns OFF the eighth to tenth mode flags DF8 to DF10 and the twelfth mode flag DF12. Then, by using the indicator image DI1, the CPU core 21 displays a leftward arrow M11 (not shown) near the current touch input position DC1 and the guide image M7 (see FIG. 10) around the start point position DC2 over the information content displayed on the second LCD 12 (step 138), and determines whether or not the user has lifted the stylus 16 (step 139). The CPU core 21 proceeds to step 140 if the user has lifted the stylus 16, and to step 141 if the user is still touching the touch panel 15.

In step 140, the CPU core 21 performs the eleventh mode operation based on the eleventh mode flag DF11 currently being ON, and exits the subroutine. The eleventh mode operation is performed as follows. In response to a user's leftward slide operation, the CPU core 21 displays on the second LCD 12 the information content (of the previous page), which was previously displayed on the second LCD 12, or the information content of a page previous to the current page being displayed on the second LCD 12, while keeping the displayed content on the first LCD 11. For example, the eleventh mode operation realizes, on the second LCD 12, the "go back" operation of an ordinary web browser or a "previous page" operation used when reading an electronic book, etc. In a case where an electronic book whose text is written laterally from left to right is displayed on the second LCD 12, a leftward slide operation is usually used for the "previous page" operation. For other styles of writing (e.g., a book whose text is written vertically, a comic book, and books in foreign languages), a leftward slide operation may alternatively be used for the "next page" operation.

In step 141, the CPU core 21 determines whether or not the current touch input position DC1 is within the right area AR (see FIG. 11). If the touch input position DC1 is not within the right area AR, the CPU core 21 returns to step 111 (FIG. 17) to repeat the loop. If the touch input position DC1 is within the right area AR, the CPU core 21 proceeds to step 142. The CPU core 21 defines, as the right area AR used in step 141, an area that satisfies x>x1+k1 (where k1 is a constant) with respect to the start point position DC2 (x1,y1). Thus, if the current touch input position DC1 (xt,yt) satisfies xt>x1+k1, the CPU core 21 determines that the current touch input position DC1 is within the right area AR.

In step 142, the CPU core 21 turns ON the twelfth mode flag DF12 stored in the RAM 24, and turns OFF the eighth to eleventh mode flags DF8 to DF11. Then, by using the indicator image DI1, the CPU core 21 displays a rightward arrow M12 (not shown) near the current touch input position DC1 and the guide image M7 (see FIG. 10) around the start point position DC2 over the information content displayed on the second LCD 12 (step 143), and determines whether or not the user has lifted the stylus 16 (step 144). The CPU core 21 proceeds to step 145 if the user has lifted the stylus 16, and to step 111 if the user is still touching the touch panel 15.

In step 145, the CPU core 21 performs the twelfth mode operation based on the twelfth mode flag DF12 currently being ON, and exits the subroutine. The twelfth mode operation is performed as follows. In response to a user's rightward slide operation, the CPU core 21 displays on the second LCD 12 the information content (of the next page), which was previously displayed on the second LCD 12, or the information content of a page next to the current page being displayed on the second LCD 12, while keeping the displayed content on the first LCD 11. For example, the twelfth mode operation realizes, on the second LCD 12, the "go forward" operation of an ordinary web browser or a "next page" operation used when reading an electronic book, etc. In a case where an electronic book whose text is written laterally from left to right is displayed on the second LCD 12, a rightward slide operation is usually used for the "next page" operation. For other styles of writing, a rightward slide operation may alternatively be used for the "previous page" operation.

During the background-touch operation where the mode of operation is other than the encirclement mode, if the stylus 16 is moved from the currently touched area to an adjacent area after any of the eighth to twelfth mode flags DF8 to DF12 is turned ON, the mode flag being ON is turned OFF while another mode flag is turned ON. For example, if the stylus 16 is moved into the left area AL (i.e., "Yes" in step 136) after the eighth mode flag DF8 is turned ON in step 112, the eighth mode flag DF8 is turned OFF and the eleventh mode flag DF11 is turned ON. This cancels the gesture of the upward slide operation on the touch panel 15 from the start point position DC2 to the upper area AT, whereby only the leftward slide operation from the start point position DC2 to the left area AL is recognized as a valid operation gesture. Thus, a gesture of a slide operation specifying a particular operation to be performed can be easily canceled. As the stylus 16 is slid into an adjacent area, only the slide operation from the start point position DC2 to the adjacent area is recognized as a valid operation gesture.

While a stylus movement in any of four directions on the touch panel 15 is recognized as a gesture or a part of a gesture in the embodiment described above, the number of directions to be distinguished from one another may alternatively be five or more. Movements in five or more directions on the touch panel 15 can be recognized by further dividing the various areas defined around the reference area AM into smaller areas. While the guide image M7 of the embodiment described above is a rectangular shape representing the boundary of the reference area AM (see FIG. 10) based on which the user can produce a valid operation gesture on the touch panel 15, the guide image of any other suitable shape may be used alternatively. For example, in a case where movements in more than four directions on the touch panel 15 are to be recognized as mentioned above, the guide image may be of a polygon with the same number of sides as the number of directions.

Thus, in the third mode operation in step 74, the sixth mode operation in step 93, the seventh mode operation in step 108 and the ninth mode operation in step 121, etc., of the video game device 1, an operation to be performed is determined by a recognized operation gesture inputted by the user based on a combination of stylus movements on the touch panel 15 in different directions (e.g., up and down). This increases the variety of operation gestures that can be used for specifying different next operations, as compared with a case where operation gestures are each defined by a stylus movement in one direction. Moreover, a gesture of a slide operation can be easily canceled. As the stylus 16 is slid into an adjacent area, only the slide operation from the start point position to the adjacent area is recognized as a valid operation gesture. Therefore, the user can easily cancel any inappropriate slide operation and then slide the stylus 16 to give an intended instruction in a single continuous operation. Therefore, example embodiments of the present invention improves the usability of the position input method as it increases the variety of next operations that can be specified through position inputting operations while reducing problems that may occur when the user draws an inappropriate trace. Moreover, an indicator indicating a recognized operation gesture based on a user's position inputting operation is displayed near the touch position, whereby the user can readily perceive the operation gesture being inputted and the next operation to be performed.

As described above, the video game device 1 allows the user to instruct the device to perform useful operations through intuitive operations by sliding the stylus 16 on the touch panel 15. For example, when the user slides the stylus 16 upward on the touch panel 15, an image obtained through a process according to the start point position DC2 (a response image, an enlarged image, or an image displayed on the second LCD 12) is displayed on one of the display sections (the first LCD 11) that corresponds to the direction of the slide operation (i.e., the upward direction from the second LCD 12 toward the first LCD 11), while keeping the displayed content on the second LCD 12. When the user slides the stylus 16 downward on the touch panel 15, an image obtained through a process according to the start point position DC2 is displayed on one of the display sections (the second LCD 12) that corresponds to the direction of the slide operation (i.e., the downward direction from the first LCD 11 toward the second LCD 12). When the user slides the stylus 16 up and down on the touch panel 15, an image obtained through a process according to the start point position DC2 (a response image, or an image displayed on the first LCD 11) is displayed on the second LCD 12 while the image displayed on the second LCD 12 is moved to the first LCD 11, thereby switching around the information content to be displayed on the upper and lower display sections (the first LCD 11 and the second LCD 12) according to the direction of the user's slide operation (i.e., according to the reciprocal upward and downward movement along the direction in which the first LCD 11 and the second LCD 12 are arranged with respect to each other). Thus, there is an intuitive association between the direction of the user's slide operation on the touch panel 15 and the corresponding display operation. Moreover, the capability of displaying information content obtained through a particular process on one display section while keeping the original displayed content on the other display section may be useful in various situations.

While various input position processing operations are described above with respect to particular user operations for the purpose of illustration, it is understood that the present invention is not limited to the particular user operations set forth herein. For example, there may be a wider variety of slide operations that can be recognized as operation gestures on the touch panel 15.

While an embodiment of the present example has been described above with respect to a case where information content such as text and graphics that are laid open to the public on the network are viewed on the first LCD 11 and the second LCD 12 for the purpose of illustration, other information or image content may be displayed on the first LCD 11 and the second LCD 12. For example, digital data of an electronic book such as an electronic dictionary may be stored in an electronic medium so that the electronic dictionary can be viewed on the first LCD 11 and the second LCD 12 of the video game device 1.

As an example of a dual-screen liquid crystal display section, the embodiment described above employs the first LCD 11 and the second LCD 12, which are physically separate from each other and are arranged one above the other (a horizontally-split dual-screen). Alternatively, other display screen arrangements may be employed. For example, the first LCD 11 and the second LCD 12 may be provided on the primary surface of the lower housing 13b in a left-right arrangement. Alternatively, a vertically-oriented LCD having a horizontal width equal to that of the second LCD 12 and a vertical length twice that of the second LCD 12 (i.e., a physically single LCD having a dual-screen display size) may be provided on the primary surface of the lower housing 13b, and the first and second display images may be displayed in the upper and lower neighboring display areas of the LCD. Alternatively, a horizontally-oriented LCD having a vertical width equal to that of the second LCD 12 and a horizontal length twice that of the second LCD 12 may be provided on the primary surface of the lower housing 13b, and the first and second display images may be displayed in the left and right neighboring display areas of the LCD. Thus, the first and second display images may be displayed on a physically single screen divided into two display areas. With any display screen arrangement, an example embodiment of the present invention can be carried out as long as the touch panel 15 is provided on a display section on which the second display image is displayed. In a case where a physically single display screen is divided into two display areas in which the first and second display images are displayed, the touch panel 15 may be provided so as to cover the entire display screen.

While the touch panel 15 is provided integrally with the video game device 1 in the embodiment described above, it is understood that an example embodiment of the present invention can be carried out even if a video game device and a touch panel are separately provided from each other. Moreover, the touch panel 15 may alternatively be provided on the upper surface of the first LCD 11. While two display sections (the first LCD 11 and the second LCD 12) are provided in the embodiment described above, only one display section may be provided in other embodiments. Specifically, the second LCD 12 as a single display section may be provided with the touch panel 15, without providing the first LCD 11. Alternatively, the touch panel 15 may be provided on the upper surface of the first LCD 11, without providing the second LCD 12.

While a touch panel is employed as the input means for the video game device 1 in the embodiment described above, any other suitable type of pointing device may be employed. A pointing device is an input device for specifying a position or coordinates on a display screen, and may be a mouse, a track pad, a track ball, or the like. Example embodiments of the present invention can be carried out with these alternative input devices by using information in the display screen coordinate system calculated based on values outputted from the input means.

While the touch panel 15 is provided integrally with the video game device 1 in the embodiment described above, example embodiments of the present invention can be carried out by using an information processing device (input position processing device) such as an ordinary personal computer having a touch panel as one of its input means.

The input position processing program and the input position processing device of example embodiments of the present invention provide a wide variety of recognizable operation gestures that can be produced by the user using a pointing device while allowing the user to easily cancel an inputted operation gesture, and are thus useful in various applications, including an information processing device, such as a video game device, for viewing information content such as text and graphics that are laid open to the public on a network or other types of content such as electronic books, and a program executed by such an information processing device. Moreover, the input position processing program and the input position processing device of example embodiments of the present invention, allow the user to instruct the device to perform useful display operations through intuitive operations using a pointing device, and are thus useful in various applications, including an information processing device, such as a video game device, for viewing information content such as text and graphics that are laid open to the public on a network or other types of content such as electronic books, and a program executed by such an information processing device.

While example embodiments of the invention has been described in detail, the foregoing description is in all aspects illustrative and not restrictive. It is understood that numerous other modifications and variations can be devised without departing from the scope of the invention.

What is claimed is:

1. A computer-readable storage medium storing an input position processing program executed by a computer of a device that is operated based on an input position outputted from a pointing device according to a user operation, wherein:

the computer is instructed to perform:

detecting a series of pieces of position data in a predetermined coordinate system based on input positions outputted from the pointing device;

defining a reference position based on a first piece of position data among the detected series of pieces of position data and storing the reference position in a memory;

defining a plurality of areas based on the reference position with one of the defined areas being a reference area in which the reference position is located; and determining an operation to be performed based on a last piece of position data among the detected series of pieces of position data and the reference position; and said determining an operation includes:

determining a first operation including, when the last piece of position data indicates a point within a defined area other than the reference area, determining the operation to be performed based on a direction that extends from the reference position to the defined area indicated by the last piece of position data; and determining a second operation including, when an intermediate piece of position data among the detected series of pieces of position data indicates a point within a defined area other than the reference area and the last piece of position data indicates a point within the reference area, determining the operation to be performed based on a combination of directions, including a direction that extends from the reference position to the defined area indicated by the intermediate piece of position data, and a direction that extends from the defined area indicated by the intermediate piece of position data to the reference position.

2. The computer-readable storage medium storing an input position processing program according to claim 1, wherein:

said determining an operation further includes:

setting a flag including, when a position indicated by the last piece of position data moves from the reference area into another defined area, setting a flag corresponding to the other defined area and storing the flag settings in the memory;

updating a first flag including, when a position indicated by the last piece of position data moves from the defined area for which the flag has been set into yet another defined area other than the reference area after the flag is set in the flag setting, updating the flag settings so that a flag corresponding to the defined area indicated by the last piece of position data is set and storing the flag settings in the memory; and updating a second flag including, when a position indicated by the last piece of position data further moves from the defined area for which the flag has been set into the reference area after the flag is set in the flag setting or the first flag updating, updating the flag settings so that a flag corresponding to a reciprocal movement between the reference area and the defined area for which the flag has been set is set and storing the flag settings in the memory;

said determining the first operation performed by the computer determines the operation to be performed based on the flag settings from the flag setting or the first flag updating; and said determining the second operation performed by the computer determines the operation to be performed based on the flag settings from the second flag updating.

3. The computer-readable storage medium storing an input position processing program according to claim 1, wherein the computer is instructed to further perform a display control of displaying, on a display device, an indicator indicating the direction from the reference position to the defined area indicated by the last piece of position data based on which operation to be performed is determined in said determining the first operation, and an indicator indicating the combination of directions based on which operation to be performed is determined in said determining the second operation.

4. The computer-readable storage medium storing an input position processing program according to claim 1, wherein the computer is instructed to further perform a display control of displaying, on a display device, an image indicating the reference area defined in said defining the areas.

5. The computer-readable storage medium storing an input position processing program according to claim 1, wherein:

the computer is instructed to further perform a display control of displaying, on a display device, an image based on the coordinate system; and said defining the area performed by the computer defines the plurality of areas by dividing an area of the image centered about the reference area into a plurality of pieces.

6. A computer-readable storage medium storing an input position processing program executed by a computer of a device that is operated based on an input position outputted from a pointing device according to a user operation, wherein:

the computer is instructed to perform:

detecting a series of pieces of position data in a predetermined coordinate system based on input positions outputted from the pointing device;

defining a reference position based on a first piece of position data among the detected series of pieces of position data and storing the reference position in a memory;

determining a first operation including determining an operation to be performed based on a direction that extends from the reference position to a position indicated by a last piece of position data among the detected series of pieces of position data ;

determining a second operation including determining the operation to be performed based on a combination of directions, including a direction that extends from the reference position to a position indicated by an intermediate piece of position data among the detected series of pieces of position data, and a direction that extends from the position indicated by the intermediate piece of position data to the reference position; and controlling a display including displaying, on a display device, an image based on the coordinate system, and displaying, on the image near a position indicated by the last piece of position data, an indicator indicating the direction based on which operation to be performed is determined in said determining the first operation and an indicator indicating the combination of directions based on which operation to be performed is determined in said determining the second operation.

7. A computer-readable storage medium storing an input position processing program executed by a computer capable of performing a display operation of displaying images separately on a first display section and a second display section, together forming a display device, based on an input position outputted from a pointing device according to a user operation, wherein:
the computer is instructed to perform:
detecting a series of pieces of position data in a display coordinate system of an image displayed on the first display section based on input positions outputted from the pointing device, and storing the position data in a memory, wherein
said series of pieces of position data result from a sliding operation of the pointing device;
defining, as a reference position, a first piece of position data among the series of pieces of stored position data , and storing the reference position in the memory;
processing to obtain a display image based on at least one piece of position data among the series of pieces of position data; and
controlling a display including, when an operation direction indicated by the series of pieces of position data in the display coordinate system with respect to the reference position indicates a reference direction that extends from a position of the first display section toward a position of the second display section, displaying the display image obtained in the processing on the second display section.

8. The computer-readable storage medium storing an input position processing program according to claim 7, wherein:
the computer performs, based on the input position, a display process of a web browser for downloading a file via a communications section capable of communicating with a network and displaying the file on the display device;
when the reference position is located within an active area of the web browser, the processing performed by the computer obtains a response image corresponding to the active area; and
when the operation direction indicates the reference direction, said controlling the display performed by the computer includes displaying the response image on the second display section.

9. The computer-readable storage medium storing an input position processing program according to claim 8, wherein:
when the reference position is located within a background area of the web browser, the processing performed by the computer obtains at least a portion of an image displayed on the first display section; and
when the operation direction indicates the reference direction, said controlling the display performed by the computer displays the at least a portion of an image displayed on the first display section on the second display section.

10. The computer-readable storage medium storing an input position processing program according to claim 8, wherein:
the reference direction is an upward direction or a downward direction in which the second display section of the display device is provided with respect to the first display section of the display device;
when the reference position is located within a background area of the web browser and the operation direction indicates a leftward direction or a rightward direction, the processing performed by the computer obtains a previous image that was obtained previously in the processing ; and
when the operation direction indicates a leftward direction or a rightward direction, said controlling the display performed by the computer includes displaying the previous image on the first display section.

11. The computer-readable storage medium storing an input position processing program according to claim 7, wherein:
when a trace represented by the series of pieces of position data substantially encircles a predetermined area of an image displayed on the first display section, the processing performed by the computer obtains an enlarged image by enlarging a portion of the image within the predetermined area; and
said controlling the display performed by the computer includes displaying the enlarged image on the second display section.

12. The computer-readable storage medium storing an input position processing program according to claim 7, wherein:
the reference direction is an upward direction or a downward direction in which the second display section of the display device is provided with respect to the first display section of the display device;
when the operation direction indicates a leftward direction or a rightward direction, the processing performed by the computer obtains an image of a different page from a current page being displayed on the first display section; and
when the operation direction indicates a leftward direction or a rightward direction, said controlling the display performed by the computer includes displaying the image of the different page on the first display section.

13. The computer-readable storage medium storing an input position processing program according to claim 7, wherein the position data in the display coordinate system based on input positions outputted from the pointing device can be defined only on one of an image displayed on the first display section and an image displayed on the second display section.

14. A computer-readable storage medium storing an input position processing program executed by a computer capable of performing a display operation of displaying images separately on a first display section and a second display section, together forming a display device, based on an input position outputted from a pointing device according to a user operation, wherein the computer is instructed to perform:
detecting a series of pieces of position data in a display coordinate system of an image displayed on the first display section based on input positions outputted from the pointing device, and storing the position data in a memory, wherein
said series of pieces of position data result from a sliding operation of the pointing device;
defining, as a reference position, a first piece of position data among the series of pieces of stored position data , and storing the reference position in the memory;
obtaining a display image based on at least one piece of position data among the series of pieces of position data; and
controlling a display including, when an operation direction indicated by the series of pieces of position data in the display coordinate system with respect to the reference position indicates a reciprocal movement along a direction in which the first display section and the second display section are arranged with respect to each other, displaying the display image obtained in the processing on the second display section while at least a portion of an image displayed on the second display section is displayed on the first display section.

15. A video game device comprising:
a touch panel that detects input positions outputted from a pointing device;
a computer-readable storage medium that stores a processing program; and
a processor that executes the processing program, based on an input position outputted from the pointing device according to a user operation, in order to perform:
detecting a series of pieces of position data in a predetermined coordinate system based on input positions detected by the touch panel and outputted from the pointing device;
defining a reference position based on a first piece of position data among the detected series of pieces of position data and storing the reference position in a computer-readable memory;
defining a plurality of areas based on the reference position with one of the defined areas being a reference area in which the reference position is located; and
determining an operation to be performed based on a last piece of position data among the detected series of pieces of position data and the reference position, said determining an operation including:
determining a first operation including, when the last piece of position data indicates a point within a defined area other than the reference area, determining the operation to be performed based on a direction that extends from the reference position to the defined area indicated by the last piece of position data; and
determining a second operation including, when an intermediate piece of position data among the detected series of pieces of position data indicates a point within a defined area other than the reference area and the last piece of position data indicates a point within the reference area, determining the operation to be performed based on a combination of directions, including a direction that extends from the reference position to the defined area indicated by the intermediate piece of position data, and a direction that extends from the defined area indicated by the intermediate piece of position data to the reference position.

16. The video game device according to claim 15, wherein:
said determining an operation further includes:
when a position indicated by the last piece of position data moves from the reference area into another defined area, setting a flag corresponding to the other defined area and storing the flag settings in the memory;
updating a first flag including, when a position indicated by the last piece of position data moves from the defined area for which the flag has been set into yet another defined area other than the reference area after the flag is set in the flag setting, updating the flag settings so that a flag corresponding to the defined area indicated by the last piece of position data is set and storing the flag settings in the memory; and
updating a second flag including, when a position indicated by the last piece of position data further moves from the defined area for which the flag has been set into the reference area after the flag is set in the flag setting or the first flag updating, updating the flag settings so that a flag corresponding to a reciprocal movement between the reference area and the defined area for which the flag has been set is set and storing the flag settings in the memory;
said determining the first operation performed by the processor determines the operation to be performed based on the flag settings from the flag setting or the first flag updating; and
said determining the second operation performed by the processor determines the operation to be performed based on the flag settings from the second flag updating.

17. The video game device according to claim 15, further comprising a display device that displays an indicator indicating the direction from the reference position to the defined area indicated by the last piece of position data based on which operation to be performed is determined in said determining the first operation, and an indicator indicating the combination of directions based on which operation to be performed is determined in said determining the second operation.

18. The video game device according to claim 15, wherein the processor executes the processing program to further perform a display control of displaying, on a display device, an image indicating the reference area defined in said defining the areas.

19. The video game device according to claim 15, wherein:
the processor executes the processing program to further perform a display control of displaying, on a display device, an image based on the coordinate system; and
said defining the areas performed by the processor defines the plurality of areas by dividing an area of the image centered about the reference area into a plurality of pieces.

20. A video game device comprising:
a touch panel that detects a series of pieces of position data in a predetermined coordinate system based on input positions outputted from a pointing device;
a computer-readable storage medium that stores a processing program; and
a processor that executes the processing program based on an input position outputted from the pointing device according to a user operation in order to perform:
defining a reference position based on a first piece of position data among the detected series of pieces of position data and storing the reference position in a computer-readable memory;
determining a first operation including determining an operation to be performed based on a direction that extends from the reference position to a position indicated by a last piece of position data among the detected series of pieces of position data;
determining a second operation including determining the operation to be performed based on a combination of directions, including a direction that extends from the reference position to a position indicated by an intermediate piece of position data among the detected series of pieces of position data, and a direction that extends from the position indicated by the intermediate piece of position data to the reference position; and
a display device that displays an image based on the coordinate system, and displays, on the image near a position indicated by the last piece of position data, an indicator indicating the direction based on which operation to be performed is determined in determining the first operation and an indicator indicating the combination of directions based on which operation to be performed is determined in determining the second operation.

21. A game device comprising:
- a display device including a first display section and a second display section that is separate from the first display section;
- a touch panel, associated with one of the first display section and the second display section of the display device;
- a computer-readable storage medium that stores a processing program; and
- a processor that executes the processing program based on an input position detected by the touch panel and outputted from a pointing device according to a user operation in order to perform:
- detecting a series of pieces of position data in a display coordinate system of an image displayed on the first display section based on input positions outputted from the pointing device, and storing the position data in a computer-readable memory, wherein said series of pieces of position data result from a sliding operation of the pointing device;
- defining, as a reference position, a first piece of position data among the series of pieces of stored position data, and storing the reference position in the memory;
- processing to obtain a display image based on at least one piece of position data among the series of pieces of position data; and
- controlling a display including, when an operation direction indicated by the series of pieces of position data in the display coordinate system with respect to the reference position indicates a reference direction that extends from a position of the first display section toward a position of the second display section, displaying the display image obtained in the processing on the second display section.

22. The video game device according to claim 21, wherein:
the processor executes the processing program to perform, based on the input position, a display process of a web browser for downloading a file via a communications section capable of communicating with a network and displaying the file on the display device;
when the reference position is located within an active area of the web browser, the processing performed by the processor obtains a response image corresponding to the active area; and
when the operation direction indicates the reference direction, said controlling the display control performed by the processor includes displaying the response image on the second display section.

23. The video game device according to claim 22, wherein:
when the reference position is located within a background area of the web browser, the processing performed by the processor obtains at least a portion of an image displayed on the first display section; and
when the operation direction indicates the reference direction, said controlling the display performed by the processor displays the at least a portion of an image displayed on the first display section on the second display section.

24. The video game device according to claim 22, wherein:
the reference direction is an upward direction or a downward direction in which the second display section of the display device is provided with respect to the first display section of the display device;
when the reference position is located within a background area of the web browser and the operation direction indicates a leftward direction or a rightward direction, the processing performed by the processor obtains a previous image that was obtained previously in the processing; and
when the operation direction indicates a leftward direction or a rightward direction, said controlling the display performed by the processor includes displaying the previous image on the first display section.

25. The video game device according to claim 21, wherein:
when a trace represented by the series of pieces of position data substantially encircles a predetermined area of an image displayed on the first display section, the processing performed by the processor obtains an enlarged image by enlarging a portion of the image within the predetermined area; and
said controlling the display performed by the processor includes displaying the enlarged image on the second display section.

26. The video game device according to claim 21, wherein:
the reference direction is an upward direction or a downward direction in which the second display section of the display device is provided with respect to the first display section of the display device;
when the operation direction indicates a leftward direction or a rightward direction, the processing performed by the processor obtains an image of a different page from a current page being displayed on the first display section; and
when the operation direction indicates a leftward direction or a rightward direction, said controlling the display performed by the processor includes displaying the image of the different page on the first display section.

27. The video game device according to claim 21, wherein the position data in the display coordinate system based on input positions outputted from the pointing device can be defined only on one of an image displayed on the first display section and an image displayed on the second display section.

28. A video game device comprising:
- a display device including a first display section and a second display section that is separate from the first display section;
- a touch panel, associated with one of the first display section and the second display section of the display device;
- a computer-readable storage medium that stores a processing program; and
- a processor that executes the processing program based on an input position detected by the touch panel and outputted from a pointing device according to a user operation in order to perform:
- detecting a series of pieces of position data in a display coordinate system of an image displayed on the first display section based on input positions outputted from the pointing device, and storing the position data in a memory, wherein said series of pieces of position data result from a sliding operation of the pointing device;
- defining, as a reference position, a first piece of position data among the series of pieces of stored position data, and storing the reference position in the memory;
- obtaining a display image based on at least one piece of position data among the series of pieces of position data; and
- controlling a display including, when an operation direction indicated by the series of pieces of position data in the display coordinate system with respect to the reference position indicates a reciprocal movement along a direction in which the first display section and the second display section are arranged with respect to each other, displaying the display image obtained in the processing on the second display section while at least a portion of an image displayed on the second display section is displayed on the first display section.

* * * * *